(12) United States Patent
Kale et al.

(10) Patent No.: US 11,576,297 B2
(45) Date of Patent: Feb. 14, 2023

(54) AUTOMATIC SELECTIVE CONTROL VALVE (SVC) CONFIGURATION DETECTION, AND OPERATION ASSIGNMENT, DIRECTIONALITY CONFIRMATION, AND CALIBRATION FOR TOWABLE IMPLEMENTS TOWABLE BY WORK VEHICLES

(71) Applicant: Deere & Company, Moline, IL (US)

(72) Inventors: Mandar M. Kale, Pune (IN); Sandeep Ekhe, Ahmednagar (IN); Shoebreza Shaikh, Pune (IN); Adam D. Sporrer, Huxley, IA (US); Ricky B. Theilen, Bettendorf, IA (US); Lucas B. Larsen, Ankeny, IA (US)

(73) Assignee: Deere & Company, Moline, IL (US)

( * ) Notice: Subject to any disclaimer, the term of this patent is extended or adjusted under 35 U.S.C. 154(b) by 327 days.

(21) Appl. No.: 16/886,049

(22) Filed: May 28, 2020

(65) Prior Publication Data

US 2021/0372441 A1 Dec. 2, 2021

(51) Int. Cl.
*F15B 21/08* (2006.01)
*F15B 11/16* (2006.01)
(Continued)

(52) U.S. Cl.
CPC .......... *A01B 76/00* (2013.01); *G05B 19/4155* (2013.01); *A01B 49/06* (2013.01);
(Continued)

(58) Field of Classification Search
CPC ......... A01B 76/00; A01B 49/06; A01B 59/00; A01B 63/10; A01B 63/111; A01B 63/22;
(Continued)

(56) References Cited

U.S. PATENT DOCUMENTS

| 6,061,617 A * | 5/2000 | Berger | E02F 3/438 |
| | | | 701/34.2 |
| 6,378,619 B2 * | 4/2002 | Mayerle | A01C 7/205 |
| | | | 172/459 |

(Continued)

FOREIGN PATENT DOCUMENTS

EP 3232759 B1 2/2019

OTHER PUBLICATIONS

Extended European Search Report and Written Opinion issued in European Patent Application No. 21172591.6, dated Oct. 19, 2021, in 07 pages.

(Continued)

*Primary Examiner* — Mussa A Shaawat
(74) *Attorney, Agent, or Firm* — Tucker Ellis LLP

(57) ABSTRACT

Systems and methods provide automatic assignment of control of a plurality of hydraulic circuits of an associated work vehicle to a plurality of operation systems of an implement. A hydraulic circuit assignment control unit includes a processor, a memory device, logic stored in the memory device, and a communication circuit operatively coupled with the processor. The processor executes the logic to associate an activation of a first hydraulic circuit of the plurality of hydraulic circuits of the associated work vehicle with a physical exercise of an operation system of the plurality of operation systems of the associated implement, and generates pairing assignment data representative of the association of the activated first hydraulic circuit with the physical exercise of the operation system of the implement. The logic generates directionality confirmation and calibration data that is communicated to the plurality of operation systems with the pairing assignment data.

18 Claims, 14 Drawing Sheets

(51) Int. Cl.
*G05B 19/4155* (2006.01)
*A01B 76/00* (2006.01)
*A01B 49/06* (2006.01)
*A01C 21/00* (2006.01)

(52) U.S. Cl.
CPC .... *A01C 21/00* (2013.01); *G05B 2219/32403* (2013.01); *G05B 2219/41273* (2013.01)

(58) Field of Classification Search
CPC ......... A01B 63/32; A01C 21/00; A01C 19/00; A01C 7/081; G05B 19/4155; G05B 2219/32403; G05B 2219/41273
See application file for complete search history.

(56) References Cited

U.S. PATENT DOCUMENTS

| | | | |
|---|---|---|---|
| 8,176,992 B2* | 5/2012 | Yuen | A01B 73/048 172/311 |
| 2016/0017901 A1* | 1/2016 | Kanenawa | F15B 11/044 60/468 |
| 2016/0157413 A1* | 6/2016 | Kowalchuk | A01B 63/22 172/4 |
| 2016/0219781 A1* | 8/2016 | Henry | A01C 23/007 |
| 2019/0124822 A1* | 5/2019 | Czapka | A01B 73/067 |
| 2019/0343032 A1* | 11/2019 | Stanhope | A01B 76/00 |
| 2019/0387659 A1* | 12/2019 | Ferrari | A01B 79/005 |
| 2019/0389519 A1* | 12/2019 | Bergsten | A01B 59/067 |
| 2020/0060064 A1* | 2/2020 | Wu | A01B 63/10 |
| 2020/0060066 A1* | 2/2020 | Blunier | A01B 63/008 |
| 2020/0337209 A1* | 10/2020 | Kowalchuk | A01C 5/066 |
| 2020/0359543 A1* | 11/2020 | Dix | G05D 1/0246 |
| 2020/0404841 A1* | 12/2020 | Hodson | A01B 59/00 |
| 2021/0003470 A1* | 1/2021 | Schoeny | A01B 79/005 |
| 2021/0048290 A1* | 2/2021 | Henry | A01B 79/005 |
| 2021/0188252 A1* | 6/2021 | Lu | B60W 40/12 |

OTHER PUBLICATIONS

Operator's Manual, John Deere Active Implement Guidance, OMPFP13579 Issue A4, 2014.

* cited by examiner

| Operation | Sensor | SCV Assignment |
|---|---|---|
| 1st (262) | 1st set (264) | SCV1 |
| 2nd (272) | 2nd set (274) | SCV2 |
| ⋮ | ⋮ | ⋮ |
| nth (282) | nth set (284) | SCVn |

FIG. 3a

| Operation | Sensor | SCV Assignment |
|---|---|---|
| 1st (262) | 1st set (264) | SCV2 |
| 2nd (272) | 2nd set (274) | SCV1 |
| ⋮ | ⋮ | ⋮ |
| nth (282) | nth set (284) | SCVn |

FIG. 3b

| Operation | Nominal | Command Type | Calibrated Command Level |
|---|---|---|---|
| fan speed (262) | 100 RPM | speed | 25 gal./min. |
| Depth (272) | 1 inch | pressure | 40 gal./min. |
| fold/unfold (282) | 3 minutes | motion | 35 gal./min. |

FIG. 4

| Operation | SCV Assignment | SCV Logic | Operation Calibration | Operation Nominal |
|---|---|---|---|---|
| 1 | SCV1 | 1 | 25 gal./min. | 100 RPM |
| 2 | SCV2 | -1 | | |
| 3 | SCV3 | 1 | 40 gal./min. | 1 inch |
| 4 | | x | | |
| 5 | SCV4 | -1 | | |
| 6 | SCV5 | 1 | 35 gal./min. | 3 min. |
| 7 | SCV6 | 1 | | |

FIG. 7

AUTOMATIC SELECTIVE CONTROL VALVE (SVC) CONFIGURATION DETECTION, AND OPERATION ASSIGNMENT, DIRECTIONALITY CONFIRMATION, AND CALIBRATION FOR TOWABLE IMPLEMENTS TOWABLE BY WORK VEHICLES

FIELD OF THE DISCLOSURE

The embodiments herein relate generally to agricultural implements that are energizable by hydraulic power circuits of an associated work vehicle to perform various operations and, more particularly, to operation control applications, systems and methods for automatic hydraulic power circuit configuration detection, assignment of control of the hydraulic power circuits of the work vehicle to operation control units on the implement, circuit directionality confirmation, and automatic calibration of the control units. Although the embodiments will be described with reference to towed agricultural cart implements, it is to be appreciated that the claimed embodiments are also amenable to other applications and operating conditions, and can be equivalently extended to other embodiments and environments such as for example to earthmoving applications or industrial and other applications or anywhere there is a need to perform an automatic hydraulic circuit detection and assignment to operational control units, to confirm or correct circuit directionality or to calibrate the hydraulic power circuits for performing operations of the implement using hydraulic power of the work vehicle.

BACKGROUND

Agricultural tractors are used in combination with a wide variety of implements which may be towed, pushed or carried by the tractor. For example, a tractor/bailer combination is used in agriculture to take up crop lying or standing on a field and to press and bind it into a bale. A tractor/sprayer combination is used in agriculture to deposit a chemical such as a fertilizer onto the crops as the tractor tows the sprayer through the field and, similarly, a tractor/planter combination is used in agriculture to deposit seeds into the soil as the tractor tows the seeder through the field. There are many other types of implements that may perform a countless variety of operations.

It is known to use tractor power to drive hydraulic circuits that may be used locally at the tractor such as for tractor power steering for example, and that may also be used to perform various operations that may be executed by apparatus and systems provided on the different implements such as by for example connecting the tractor hydraulic circuits to hydraulic circuits on the different implements using hoses, couplers, and the like. In that way, for example, hydraulic cylinders or other hydraulically-driven mechanisms on many different types of implements may be driven by the hydraulic power generating components of the tractor. It is known to separately couple each of the hydraulic cylinders or other hydraulically-driven mechanisms that may be provided on the implements with the source of hydraulic power on the tractor using a conventional electro-hydraulic (EH) selective control valve (SCV). For convenience and safety, typical modern tractor work vehicles have a bank of SCVs arranged in an SCV "stack" for convenient coupling by an operator of multiple hydraulic hoses of an implement to the SCV stack. Once properly connected, the hydraulic cylinders or other hydraulically-driven mechanisms provided on the implements may be powered by the hydraulic drive circuits of the tractor via SCV pairs wherein each SCV pair includes for example a hydraulic supply coupling on the work vehicle for porting pressurized hydraulic fluid from the work vehicle to the implement, as well as a corresponding hydraulic return coupling on the implement for returning the hydraulic fluid from the implement back to the work vehicle.

It is also known to provide work vehicles and implements with communication networks for communication of command and control information and signals between various electronic control and monitoring systems of the tractor/implement combination. For example, a fan speed on an air seeder implement may be controlled by an operation control unit on the air seeder. The air seeder operation control unit may send a command via the communication network to a control unit in the tractor for the tractor hydraulic power circuits to supply, via an appropriately selected SVC pair, a specified volume rate of flow of hydraulic fluid to the hydraulic mechanism on the implement driving the air seeder fan. Similarly, a burrowing tool on the air seeder implement may be controlled by a further operation control unit on the air seeder by sending a further command via the communication network to the control unit in the tractor to supply, via a further different appropriately selected SVC pair, a specified volume rate of flow of hydraulic fluid to a hydraulic cylinder driving the burrowing tool.

One such communication network for communication of command and control information and signals between various electronic control and monitoring systems of the tractor/implement combination that has met with success in agriculture and many other applications is the Controller Area Network (CAN). CAN is a serial bus network of microcontrollers that connects devices, sensors and actuators in a system or sub-system for real-time control applications. An advantage of CAN is that it allows microcontrollers and devices executing applications to communicate with each other without the need for a host computer.

Equipment operators having a tractor and only a single implement may set up the tractor/implement combination to operate using the CAN bus or other network to configure one or more power delivery control units in the tractor executing tractor control application software ("Tractor Apps."), and to configure one or more operational control units in the implement executing implement control application software ("Implement Apps."). The Tractor Apps. may be used for example by the operator using a human interface in the cab of the tractor work vehicle for example to manually configure a SCV connection mapping between particular hydraulic power circuits or sub-circuits on the tractor and particular operations on the implement, and also to manually set up various calibration parameter settings of the hydraulic power units such as to specify a desired flow in gal./min. of hydraulic flow fora selected SCV pair for delivering power to a selected operation. Similarly, the Implement Apps. may be used by the operator using the human interface in the cab of the tractor work vehicle for example to manually set various parameters relative to the operational units or systems on the implement to make adjustments in order to set up the systems for a desired result such as, for example, to set a desired fan speed, a seed depth, a time to fold/unfold or extend/retract, or the like.

However, equipment operators such as farmers often have a wide range of different implements that they would like to be able to use with their typically limited set of tractors. This being the case, it is important for the operator to remember and replicate the tractor-implement SCV connection configuration each time the implements are changed and for each tractor/implement combination so that the Tractor and Implement Apps. match the actual SCV connection scheme.

However, manually setting up configuration and calibration functions in Tractor/Implement Apps. is time consuming. In addition an incorrect SCV configuration and/or calibration may result in an undesirable performance result or worse, it may result in unintentional motion or damage to the implement.

Given the above, therefore, it is desirable to provide systems and methods for automatic configuration detection of hydraulic circuits of a work vehicle for assignment of the control of hydraulic circuits of the work vehicle to operational control units of an implement.

It is also desirable to provide systems and methods providing automatic hydraulic circuit directionality confirmation, and directionality correction if necessary, to reverse the logic of one or more of an SCV coupler bank, the Tractor App. and/or the Implement App. to match the physical coupling arrangement with the control application logic so that the portions of the implement may be operated in the direction as intended by the operator.

It is also desirable to provide systems and methods for an automatic calibration of the hydraulic circuits once detected and assigned, and corrected for directionality if necessary, so that the operational control units of the implement may be used with high efficiency at nominal settings and to also automatically provide scaling parameters for operation at other sub/supra nominal control settings.

Overall therefore it is desirable to provide fully automated systems and methods for automatic selective control valve (SVC) configuration detection, assignment of operations to the circuits, circuit directionality confirmation and/or correction, and operation calibration in implements towable by work vehicles.

SUMMARY

The embodiments herein provide for new and improved systems and methods for automatic assignment of control of hydraulic circuits of a work vehicle to operational control units of an implement.

The embodiments herein further provide an automatic selective control valve (SVC) configuration detection, circuit directionality confirmation and/or correction, and operation assignment and calibration system and method for towable implements towable by work vehicles.

In accordance an aspect, a system is provided for automatic assignment of control of a plurality of hydraulic circuits of an associated work vehicle to a plurality of operation systems of an associated implement operatively coupled with the associated work vehicle. The system includes a hydraulic circuit assignment control unit operatively coupled with an associated implement communication network of the associated implement. The hydraulic circuit assignment control unit includes a processor, a memory device operatively coupled with the processor, an assignment logic stored in the memory device, and a communication circuit operatively coupled with the processor. The assignment logic is executable by the processor to associate an activation of a first hydraulic circuit of the plurality of hydraulic circuits of the associated work vehicle with a physical exercise of a first operation system of the plurality of operation systems of the associated implement, and generate first pairing assignment data representative of the association of the activation of the first hydraulic circuit of the associated work vehicle with the physical exercise of the first operation system of the associated implement, wherein the physical exercise of the first operation system is caused by the activation of the first hydraulic circuit of the associated work vehicle. The assignment logic is further executable by the processor to associate an activation of a second hydraulic circuit of the plurality of hydraulic circuits of the associated work vehicle with a physical exercise of a second operation system of the plurality of operation systems of the associated implement, and generate second pairing assignment data representative of the association of the activation of the second hydraulic circuit of the associated work vehicle with the physical exercise of the second operation system of the associated implement, wherein the physical exercise of the second operation system is caused by the activation of the second hydraulic circuit of the associated work vehicle. The communication circuit operates to communicate the first pairing assignment data to a first operation control unit of the first operation system of the associated implement via the associated implement communication network, wherein the first hydraulic circuit of the plurality of hydraulic circuits of the associated work vehicle is assigned to the first operation control unit based on the first pairing assignment data for control by the first operation control unit of the first operation system of the associated implement using the first hydraulic circuit of the associated work vehicle. The communication circuit further operates to communicate the second pairing assignment data to a second operation control unit of the second operation system of the associated implement via the associated implement communication network operatively coupling the second operation control unit with the hydraulic circuit assignment control unit, wherein the second hydraulic circuit of the plurality of hydraulic circuits of the associated work vehicle is assigned to the second operation control unit based on the second pairing assignment data for control by the second operation control unit of the second operation system of the associated implement using the second hydraulic circuit of the associated work vehicle.

Other embodiments, features and advantages of the example embodiments for brake performance monitoring for vehicle platooning operation will become apparent from the following description of the embodiments, taken together with the accompanying drawings, which illustrate, by way of example, the principles of the example embodiments.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

FIG. 3a is a schematic view of a SCV connection table for automatic assignment of control of hydraulic circuits of a work vehicle to operation systems of an implement operatively coupled with the work vehicle in accordance with the example embodiment of FIG. 2.

FIG. 3b is a schematic view of a SCV connection table for automatic assignment of control of hydraulic circuits of a work vehicle to operation systems of an implement operatively coupled with the work vehicle in accordance with a further example embodiment.

FIG. 4 is a schematic view of a calibration table for use in calibrating command signals to operations in accordance with an example embodiment.

FIG. 7 is a schematic view of a SCV connection table for automatic assignment of control of hydraulic circuits of a work vehicle to operation systems of an implement operatively coupled with the work vehicle in accordance with the example embodiment of FIG. 6.

DETAILED DESCRIPTION

In the following description reference is made to the accompanying figures which form a part thereof, and in which is shown, by way of illustration, one or more example embodiments of the disclosed system and method for automatic SVC configuration detection, and operation assignment, direction confirmation, and calibration system and method for towable implements towable by work vehicles. Various modifications of the example embodiments may be contemplated by on of skill in the art.

Figure 1:
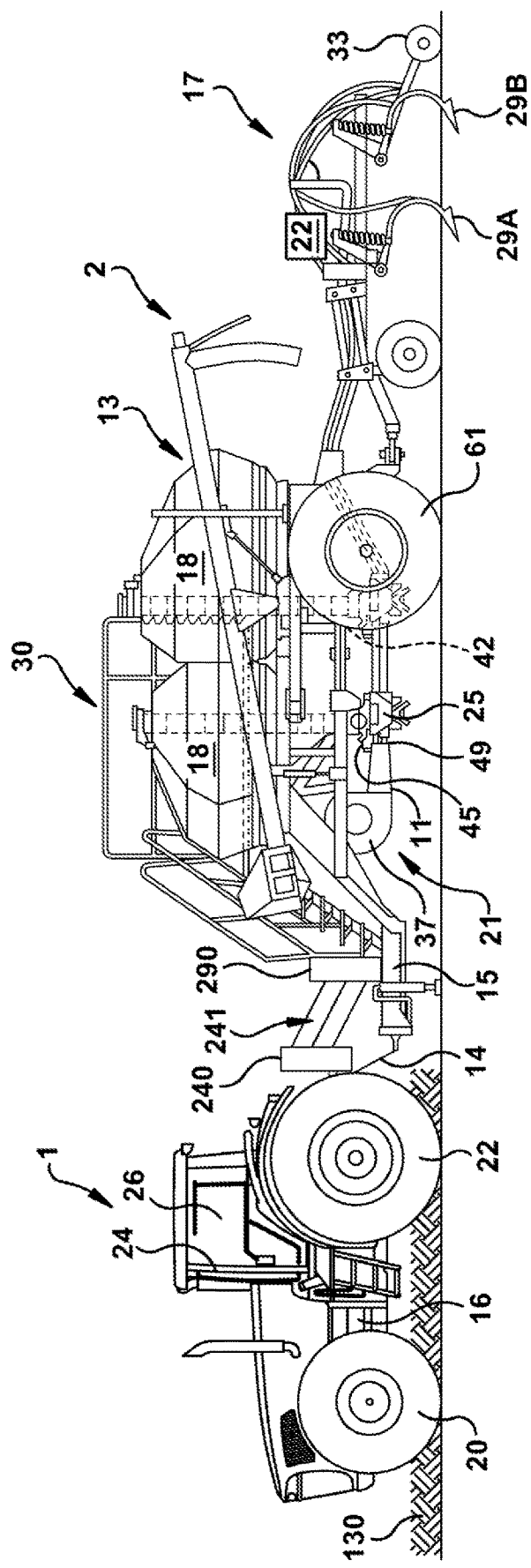
FIG. 1 is a simplified side view of a tractor with a seeder coupled thereto.

Referring now to the drawings, wherein the showings are only for the purpose of illustrating the example embodiments only and not for purposes of limiting the same, FIG. 1 is a simplified side view of a work vehicle shown in the example embodiment as a tractor 1, and an implement 2 shown in the example embodiment as a seeding machine 30. As illustrated, the seeding machine 30 is coupled to a tractor drawbar 14 by means of a seeder drawbar 15. The tractor 1 is supported on a frame 16, which is supported on ground engaging steerable front wheels 20 and ground engaging driven rear wheels 22. The frame 16 supports a cab 24 which includes an operator's station 26. The tractor 10 may include a conventional power take-off or PTO shaft which is connected to a corresponding drive shaft of the seeder 2. In addition, the tractor 1 may include an SCV coupler bank 240 provided in an area at the rear of the tractor 1. A corresponding SCV plug bank 290 is provided on the implement, and the SCV coupler and plug banks 240, 290 are connected together with a flexible hose bundle 241 for delivering power to the implement 2 from hydraulic power circuits of the tractor 1. In addition to providing a hydraulic connection between the tractor 1 and the implement 2, the flexible hose bundle 241 may also include a wire harness 211 (FIG. 2) for coupling control and communication networks of the tractor and implement 1, 2.

As also shown in FIG. 1, the implement 2 comprises a seed cart 13 and a tilling implement 17. The seed cart 13 is typically towed by the tractor 1 through a field to be seeded. The seed cart 13 has a frame supporting a number of storage tanks 18 with wheels 61 rotatably mounted to the frame. The product contained in the storage tanks 18 may include seed, fertilizer, or other agricultural particles. Each storage tank 18 is provided with a volumetric meter 42. Each volumetric meter 42 is positioned below the respective storage tank 18 and receives product therefrom for controlled feeding of the product into a pneumatic distribution system 21.

The tilling implement 17, towed behind the seed cart 13, comprises a frame to which ground openers 29A, 29B are mounted. The tilling implement 17 may also include seed row finishing equipment such as packers 33. Located below each volumetric meter 42 is a primary air distribution manifold 25 that is part of the pneumatic distribution system 21. The pneumatic distribution system 21 distributes metered product from the storage tanks 18 to the ground openers 29A, 29B and comprises a fan or blower 37 driven by a motor which directs a stream of pressurized air through an adjustable damper 41, which thereafter directs the air stream into a top rank portion directed into an upper rank of first tubes 45 and a bottom rank portion directed into a bottom rank of first tubes 49.

FIG. 1 illustrates a double shoot air seeder by way of example of an implement wherein a first product contained in one of the storage tanks 18 is directed to the top rank portion 45 of the air stream and the second product contained in the other of the storage tanks 18 is directed to the bottom rank portion 49 of the air stream. Triple shoot applications in which three products are added to three different rank portions of the air stream are also utilized in certain situations. The particular type and/or function of the implement is not important, however, in connection with the embodiments of the methods and systems for automatic SVC configuration detection, and circuit assignment, directionality confirmation, and calibration for towable implements towable by work vehicles described and claimed. It is therefore to be appreciated that the methods and systems for automatic SVC configuration detection, and assignment and calibration herein may be used on any other implements and in any other apparatus beyond the particular seeding machine implementation shown, which is merely an example embodiment to help facilitate the description of the embodiments herein.

Figure 2:
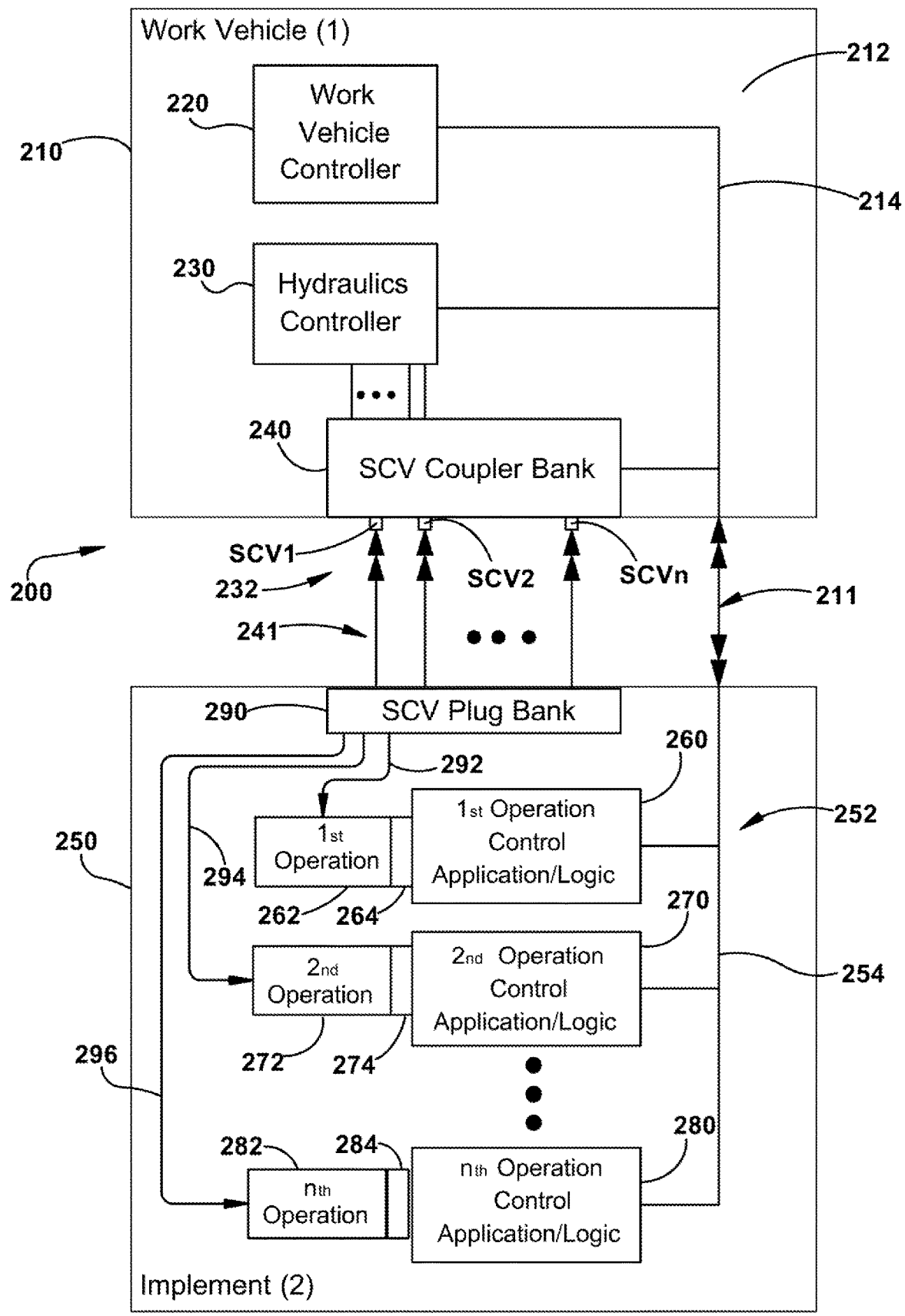
FIG. 2 is a schematic diagram of a control system of the tractor/seeder combination of FIG. 1 in accordance with an example embodiment.

FIG. 2 is a schematic diagram of a control system 200 of the tractor/implement shown in FIG. 1. With reference now to that Figure, the control system 200 includes a work vehicle control portion 210 disposed in or on the tractor 1, and an implement control portion 250 disposed in or on the implement 2. The work vehicle control portion 210 includes a work vehicle network 212 including a bus 214 that is provided for interfacing various components including for example a work vehicle controller 220 and a hydraulics controller 230 of the work vehicle control portion 210. The work vehicle network 212 can be a CAN or any other equivalent network capable of delivering data and control signals between the various electronic control and data components of the work vehicle control portion 210. The work vehicle controller 220 is operative in the example embodiment to control functions of the tractor 1 such as for example engine monitoring, operator interface features, data collection and communication functions, and the like. The hydraulics controller 230 is operational in the example environment to control functions of the hydraulic power circuits of the tractor 1 such as tractor steering and the like as well as to control or otherwise power operations of the implement in ways to be described in greater detail below.

In the example illustrated, the hydraulics controller 230 generates flows of pressurized hydraulic fluid for distribution from the tractor 1 to the implement 2 via an SCV coupler bank 240 provided in an area at the rear of the tractor 1. The coupler bank 240 connected with the hydraulic fluid power from the hydraulics controller 230 is in turn coupled with the implement via a set of hydraulic connectors 232 and also by using a flexible hose bundle 241 for example. It is to be appreciated that each of the individual hydraulic circuits of the work vehicle includes an SCV pair comprising a connection to a pressurized source of hydraulic fluid provided at a first SCV of each SCV pair, and a corresponding connection to a return for the hydraulic fluid provided at a second SCV of each SCV pair. Each SCV pair may be suitably marked for differentiation such as by using color-coded marking bands or the like. However, since the source and return fittings of the hydraulic circuits have similar form factors and could inadvertently be connected in reverse, the coupler bank 240 in accordance with an example embodiment herein includes logic and electromechanical elements capable of selectively effecting a logical change within the coupler bank 240 to route the pressurized sources of the hydraulic fluid to a first SCV of the SCV pair and to route the return of the hydraulic fluid to the other the second SCV of the SCV pair, and vice a versa for directionality correction as may be desired or necessary to essentially reverse the hydraulic fluid flow through any of the SCV pairs as needed for effecting the directional routing expected by the implement.

The implement control portion 250 of the system 200 is provided on the implement for controlling various operations of the implement such as for controlling fan speeds of the blower 37, for controlling raise and lower operations for setting depths of burrowing tools such as the ground openers 29A and 29B, for controlling fold and unfold operations to move sprayer booms for example, and the like. For this reason, the implement control portion 250 includes one or more operation control applications or logic including, for example, a first operation control application or logic 260 for controlling a first operation 262 of the implement, a second operation control application or logic 270 for controlling a second operation 272 of the implement, and an nth operation control application or logic 280 for controlling an nth operation 282 of the implement. By way of example, the first operation 262 may be provided for controlling the speed of a first fan of the blower 37 of the implement for delivering seed to the soil. The second operation 272 may be provided for controlling raise and lower operations such as for setting the depth of a burrowing tool of the seeder 1 such as the ground openers 29A, 29B described above. Lastly, the nth operation 282 may be, for example, a fold and unfold operation for moving parts of the implement to transition the implement between a use mode and storage or transport modes. The implement control portion 250 may include other operation control applications or logic for controlling one or more other operations 262 of the implement as may be necessary or desired.

The implement control portion 250 of the system 200 includes an implement network 252 including a bus 254 that is provided for interfacing various components including for example the first, second, and nth operation control applications 260, 270, 280. The implement network 252 may be a CAN or any other equivalent network capable of delivering data and control signals between the various logic electronic control and data components of the implement control portion 250. In the embodiment illustrated, the work vehicle network 212 is in operative communication with the implement network 252 via a connection 211 which may be a pluggable control and communication signal line connector providing an operator with the ability to easily attach and detach the implement from the work vehicle as may be desired or necessary so that other implements may be similarly used with the work vehicle. In addition to the above, the implement control portion 250 of the control system 200 further includes a SCV plug bank 290 in operative communication with the operations 262, 272, and 282 of the implement for communicating hydraulic fluid flows and pressures to the various operations under the control of the operation control applications or logic 260, 270, and 280. In the embodiment illustrated, the SCV plug bank 290 is in operative fluid communication with the SCV coupler bank 240 provided on the work vehicle via the hose bundle 241. In the embodiment illustrated, a plurality of hydraulic lines 292, 294, and 296 extend in the implement 1 from the SCV plug bank 290 to physical locations at the implement operations as may be needed for enabling the functional operational units of the implement to be connected with the several hydraulic power sources disposed in the work vehicle under control of the hydraulics controller 230.

In the example embodiment illustrated, the first operational unit 262 of the implement is connected with the first hydraulic power source in the work vehicle via a first SCV connector pair SCV1 including for example supply and return hydraulic connections. The second operation 272 of the implement is connected with the hydraulic power source in the work vehicle via a second SCV connection pair SCV2, and the nth operational unit 282 of the implement is connected to the hydraulic power source in the work vehicle via a nth SCV connection pair SCVn. During operation, the first operation control application or logic 260 may issue commands to the hydraulics controller 230 via the implement and work vehicle networks 252, 212 in order to effectuate desired operations and functions of the first operation 262. The commands may include for example, commands for a desired flow rate of hydraulic fluid such as for example a command for 30 gal./min. or 50 gal./min., or the like, for controlling a fan speed of the blower 37 for example. Similarly, the second operation control application or logic 270 may issue commands to the hydraulics controller 230 via the implement and work vehicle networks 252, 212 in order to control the hydraulic power sources to deliver a specified flow of hydraulic fluid in order to effectuate a desired operation at the second operation 272 such as to control a raise/lower operation to set the depth of a burrowing tool for example by sending a command of 40 gal./min.

in order to set a desired pressure at the burrowing tool against the ground. Also similarly, the nth operation control application or logic 280 may issue one or more commands to the hydraulics controller 230 via the implement and work vehicle networks 252, 212 to deliver a specified flow of hydraulic fluid in order to effectuate desired results at the nth operation 282 such as a command for a flow of 35 gal./min. in order to effect fold/unfold motion operations within a desired maximum elapsed time of 3 minutes, for example.

In accordance with the example embodiments herein, automatic selective control valve (SCV) configuration detection, and assignment, directionality confirmation (and logical directionality correction if necessary), and calibration of operations of an implement is provided. In this regard, the first operation control application or logic 260 may learn or otherwise be trained in an automatic SCV configuration detection method of an example embodiment that the first operation 262 is operatively coupled with the first hydraulic circuit of the work vehicle via the first SCV connection SCV1. In the example embodiment, any of the control applications 260, 270, 280 individually or collectively, or a master control application or logic to be described in further detail below, but preferably the first operation control application 260, issues a command to the work vehicle control portion 210 during the configuration detection training method via the vehicle and implement networks 212, 252 for the hydraulics controller 230 to sequentially exercise its hydraulic circuits at the SCV coupler bank 240, beginning with for example the first hydraulic circuit. The operation coupled with the first hydraulic circuit at the SCV plug bank 290 via the first hydraulic line 292; namely the first operation 262 in the example embodiment, will correspondingly sense movement(s) of one or more apparatus of the first operation 262 such as by the first operation control application 260 receiving one or more signals from a corresponding one or more sensor devices 264 or the like associated with the first operation 262 for learning or being trained that the first operation 262 of the implement 2 is coupled with the first hydraulic circuit of the tractor via the first SCV connection SCV1.

In the example embodiment the one or more sensor devices 264 are tightly coupled with the first operation 262. That is, the one or more sensor devices 264 are used exclusively by the first operation 262, and not by any of the other operations. In that way, any SCV configuration resulting from an operator making random connections at the hose bundle can be detected by signals received only by the sensor devices 264 based on a particular hydraulic circuit of the work vehicle being activated responsive to any of the control applications 260, 270, 280 issuing a command to the work vehicle control portion 210 during the configuration detection training method via the vehicle and implement networks 212, 252 for the hydraulics controller 230 to exercise the particular hydraulic circuit at the SCV coupler bank 240.

The one or more sensor devices 264 are also used by the first operation 262 for directionality confirmation, and for directionality correction if necessary, by providing feedback representative of the results in the fan speed of the example embodiment responsive to the commanded hydraulic flow rate being provided to the hydraulics controller 230 by the first operation 262. The sensors provide an indication of the direction of the movement of the controlled component and in that way the controller directionality logic may be adjusted if necessary. Similarly the sensor devices 264 are further used by the first operation 262 for calibrating the operation to provide a calibration constant relating the command for the desired flow rate of hydraulic fluid of 30 gal./min. or 50 gal./min. as described above to the sensed fan speed such as in revolutions per minute (RPMs) sensed by an electrical speed sensor, air pressure sensor, or the like comprising the one or more sensor devices 264. In one embodiment the operation increases the commanded hydraulic flow rate being provided to the hydraulic controller 230 in increments such as for example in 10% increments of the full range of hydraulic power until a nominal setting of the fan speed is realized as determined by the first sensors 264 thereby determining a hydraulic flow rate command calibration parameter needed for achieving a nominal operation output, and also thereby determining a calibration parameter for other sub/supra nominal output settings as a slope of a hydraulic command versus output as determined by the sensors for the operation.

Similarly, the second operation control application 270 may learn or otherwise be trained in the automatic SCV configuration detection method of the example embodiment that the second operation 272 is operatively coupled with the second hydraulic circuit of the work vehicle via the second SCV connection SCV2. In this regard, any of the control applications 260, 270, 280 individually or collectively, or the master control application or logic to be described in further detail below, but preferably the second operation control application 270, issues a command to the work vehicle control portion 210 during the configuration detection training method via the vehicle and implement networks 212, 252 for the hydraulics controller 230 to exercise its second hydraulic circuit at the SCV coupler bank 240. The operation coupled with the second hydraulic circuit at the SCV plug bank 290 via the second hydraulic line 294; namely the second operation 272 in the example embodiment, will correspondingly sense movement(s) of one or more apparatus of the second operation 272 such as by the second operation control application 270 receiving one or more signals from a corresponding one or more sensor devices 274 or the like associated with the second operation 272 for learning or being trained that the second operation 272 of the implement 2 is coupled with the second hydraulic circuit of the tractor via the second SCV connection SCV2.

In the example embodiment the one or more sensor devices 274 are tightly coupled with the second operation 272. That is, the one or more sensor devices 274 are used exclusively by the second operation 272, and not by any of the other operations. In that way, any SCV configuration resulting from an operator making random connections at the hose bundle can be detected by signals received only by the sensor devices 274 based on a particular hydraulic circuit of the work vehicle being activated responsive to any of the control applications 260, 270, 280 issuing a command to the work vehicle control portion 210 during the configuration detection training method via the vehicle and implement networks 212, 252 for the hydraulics controller 230 to exercise the particular hydraulic circuit at the SCV coupler bank 240.

The one or more sensor devices 274 are also used by the second operation 272 for directionality confirmation, and for directionality correction if necessary, by providing feedback representative of the results in the depth of the burrowing tool of the example embodiment responsive to the commanded hydraulic flow rate being provided to the hydraulics controller 230 by the second operation 272. The sensors provide an indication of the direction of the movement of the controlled component and in that way the controller directionality logic may be adjusted if necessary. Similarly the sensor devices 274 are further used by the second operation 272 for calibrating the operation to provide a calibration constant relating the command for the desired flow rate of hydraulic fluid of 40 gal./min. as described above to raise/lower movement of the burrowing tool depth such as in inches or centimeters sensed by an electrical position sensor, hydraulic pressure sensor, or the like comprising the one or more sensor devices 274. In one embodiment the operation increases the commanded hydraulic flow rate being provided to the hydraulic controller 230 in increments such as for example in 10% increments of the full range of hydraulic power until a nominal raise/lower setting of the burrowing tool is realized as determined by the second sensors 274 thereby determining a hydraulic flow rate command calibration parameter needed for achieving a nominal operation output, and also thereby determining a calibration parameter for other sub/supra nominal output settings as a slope of a hydraulic command versus output as determined by the sensors for the operation.

Still further in accordance with the example embodiments herein, the nth operation control application 280 may learn or otherwise be trained in the automatic SCV configuration detection method of the example embodiment that the nth operation 282 is operatively coupled with the nth hydraulic circuit of the work vehicle via the nth SCV connection SCVn. In this regard, any of the control applications 260, 270, 280 individually or collectively, or the master control application or logic to be described in further detail below, but preferably the nth operation controller 280, issues a command to the work vehicle control portion 210 during the configuration detection training method via the vehicle and implement networks 212, 252 for the hydraulics controller 230 to exercise its nth hydraulic circuit at the SCV coupler bank 240. The operation coupled with the nth hydraulic circuit at the SCV plug bank 290 via the nth hydraulic line 296; namely the nth operation 282 in the example embodiment, will correspondingly sense movement(s) of one or more apparatus of the nth operation 282 such as by the nth operation control application 280 receiving one or more signals from a corresponding one or more sensor devices 284 or the like associated with the nth operation 282 for learning or being trained that the nth operation 282 of the implement 2 is coupled with the nth hydraulic circuit of the tractor via the nth SCV connection SCVn.

In the example embodiment the one or more sensor devices 284 are tightly coupled with the nth operation 282. That is, the one or more sensor devices 284 are used exclusively by the nth operation 282, and not by any of the other operations. In that way, any SCV configuration resulting from an operator making random connections at the hose bundle can be detected by signals received only by the sensor devices 284 based on a particular hydraulic circuit of the work vehicle being activated responsive to any of the control applications 260, 270, 280 issuing a command to the work vehicle control portion 210 during the configuration detection training method via the vehicle and implement networks 212, 252 for the hydraulics controller 230 to exercise the particular hydraulic circuit at the SCV coupler bank 240.

The one or more sensor devices 284 are also used by the nth operation 282 for directionality confirmation, and for directionality correction if necessary, by providing feedback representative of the results in the fold/unfold movement of the implement parts of the example embodiment responsive to the commanded hydraulic flow rate being provided to the hydraulics controller 230 by the nth operation 282. The sensors provide an indication of the direction of the movement of the controlled component and in that way the controller directionality logic may be adjusted if necessary. Similarly the sensor devices 284 are further used by the nth operation 282 for calibrating the operation to provide a calibration constant relating the command for the desired flow rate of hydraulic fluid of 35 gal./min. as described above to the fold/unfold movement of the implement parts such as in full fold/unfold movements of the implement parts sensed by electrical position sensors, hydraulic pressure sensors, or the like comprising the one or more sensor devices 284. In one embodiment the operation increases the commanded hydraulic flow rate being provided to the hydraulic controller 230 in increments such as for example in 10% increments of the full range of hydraulic power until a nominal fold/unfold setting (in degrees per second, elapsed time for full fold/unfold, etc.) of the implement mechanism such as a sprayer boom is realized as determined by the nth sensors 284 thereby determining a hydraulic flow rate command calibration parameter needed for achieving a nominal operation output, and also thereby determining a calibration parameter for other sub/supra nominal output settings as a slope of a hydraulic command versus output as determined by the sensors for the operation such as slow/fast fold/unfold, for example, relative to a "normal" speed nominal fold/unfold operation.

The operation control applications or logic 260, 270, and 280 include collectively and/or individually logic and memory devices storing hydraulic circuit assignment relationships between the couplings between the SCV plug bank 290 on the implement and the SCV coupler bank 240 on the work vehicle, wherein the stored assignment relationships are developed during the configuration detection training method described in general above. In this regard, FIG. 3a shows a connection table 300 in accordance with an embodiment for use by operation assignment control logic disposed in one or more of the operation control applications or logic 260, 270, 280 to use for coordinating the operations 262, 272, 282 under their respective command and control with the physical connections of the hose bundle 241 between the SCV coupler bank 240 and the plug bank 290.

With reference now to that Figure, the connection table 300 stores first pairing assignment data 310 representative of an operational assignment of the first hydraulic circuit coupled on the work vehicle side with the first service control valve SCV1 as shown in table entry 320 with physical connection to the first operation 262 (FIG. 2) of the associated implement as shown in table entry 322, wherein the physical connection to the first operation 262 of the associated implement is learned during the configuration detection method described herein.

Similarly, the connection table 300 stores second pairing assignment data 312 representative of an operational assignment of the second hydraulic circuit coupled on the work vehicle side with the second service control valve SCV2 as shown in table entry 330 with physical connection to the second operation 272 (FIG. 2) of the associated implement as shown in table entry 332, wherein the physical connection to the second operation 272 of the associated implement is learned during the configuration detection method described herein.

Lastly in the example, the connection table 300 further stores $n^{th}$ pairing assignment data 314 representative of an operational assignment of the $n^{th}$ hydraulic circuit coupled on the work vehicle side with the $n^{th}$ service control valve SCVn as shown in table entry 340 with physical connection to the $n^{th}$ operation 282 (FIG. 2) of the associated implement as shown in table entry 342, wherein the physical connection to the $n^{th}$ operation 282 of the associated implement is learned during the configuration detection method described herein. It is to be appreciated that the connection table 300 may be stored in any of the operation control applications or logic 260, 270, 280 or may be shared among and/or otherwise distributed between or across the control applications. Further, the connection table 300 may be copied into each of the control applications. Still further, the connection table 300 may be stored in a separate master or supervisory control application or logic to be described in further detail below in connection with a further example embodiment.

It is further to be appreciated that different connection tables will be automatically generated in accordance with the example embodiments as a result of connections of the hose bundle 241 with the SCV coupler bank 240 of the tractor work vehicle 1 being different than those described above in connection with the first example embodiment. Any SCV configuration resulting from an operator making random connections at the hose bundle can be accommodated by the example embodiments herein for reasons including that each of the sets of sensor devices 264, 274, 284 are tightly coupled with their respective control applications 260, 270, 280 as described herein. Signals received by the sensor devices 264, 274, or 284 based on a particular hydraulic circuit of the work vehicle being activated responsive to any of the control applications 260, 270, 280 issuing a command to the work vehicle control portion 210 during the configuration detection training method to exercise the particular hydraulic circuit at the SCV coupler bank 240 are used as describe above for the automatic configuration detection.

In this regard, and by way of a further example embodiment, the first operational unit 262 of the implement may alternatively be connected with the second hydraulic power source in the work vehicle via the second SCV connector pair SCV2 such as for example by the operator connecting the supply and return hydraulic connection hose pair 292 of the first implement operation 262 to the second SCV connector pair SCV2 on the coupler bank 240 of the tractor. The second operation 272 may alternatively be connected with the hydraulic power source in the work vehicle via the first SCV connection pair SCV1 such as for example by the operator connecting the supply and return hydraulic connection hose pair 294 of the second operation 272 to the first SCV connector pair SCV1 on the coupler bank 240 of the tractor. The nth operational unit 282 of the implement 282 may alternatively be connected to the hydraulic power source in the work vehicle via a nth SCV connection pair SCVn on the coupler bank 240 of the tractor.

In this further alternative example embodiment, the first operation control application or logic 260 may learn or otherwise be trained in the automatic SCV configuration detection method of the example embodiment that the first operation 262 is operatively coupled with the second hydraulic circuit of the work vehicle via the second SCV connection SCV2. In this regard, any of the control applications 260, 270, 280 but preferably the second operation control application 270 may issue a command to the work vehicle control portion 210 via the vehicle and implement networks 212, 252 for the hydraulics controller 230 to exercise its second hydraulic circuit at the SCV coupler bank 240, wherein the first operation control application 260 may verify movement of one or more apparatus of the first operation 262 during the automatic SCV configuration detection method such as by receiving one or more signals from a corresponding one or more sensor devices 264 or the like associated of the first operation 262 for confirming that the first operation 262 of the implement 2 is coupled with the second hydraulic circuit of the tractor via the second SCV connection SCV2.

Similarly in this further alternative example, the second operation control application 270 may learn or otherwise be trained in the automatic SCV configuration detection method of the example embodiment that the second operation 272 is operatively coupled with the first hydraulic circuit of the work vehicle via the first SCV connection SCV1. In this regard, any of the control applications 260, 270, 280 but preferably the first operation control application 270 may issue a command to the work vehicle control portion 210 via the vehicle and implement networks 212, 252 for the hydraulics controller 230 to exercise its first hydraulic circuit at the SCV coupler bank 240, wherein the second operation control application 270 during the automatic SCV configuration detection method verifies movement of one or more apparatus of the second operation 272 such as by receiving one or more signals from a corresponding one or more sensor devices 274 or the like of the second operation 272 for confirming that the second operation 272 of the implement 2 is coupled with the first hydraulic circuit of the tractor via the first SCV connection SCV1.

Still further in accordance with this further alternative example, the nth operation control application 280 may learn or otherwise be trained that the nth operation 282 is operatively coupled with the nth hydraulic circuit of the work vehicle via the nth SCV connection SCVn. In this regard, any of the control applications 260, 270, 280 but preferably the nth operation controller 280 may issue a command to the work vehicle control portion 210 via the vehicle and implement networks 212, 252 for the hydraulics controller 230 to exercise its nth hydraulic circuit at the SCV coupler bank 240, wherein the nth operation control application 280 during the automatic SCV configuration detection method verifies movement of one or more apparatus of the nth operation 282 such as by receiving one or more signals from a corresponding one or more sensor devices 284 or the like of the nth operation 282 for confirming that the nth operation 282 of the implement 2 is coupled with the nth hydraulic circuit of the tractor via the nth SCV connection SCVn.

FIG. 3b shows a connection table 300' in accordance with the further alternative example embodiment described immediately above for use by operation assignment control logic disposed in one or more of the operation control applications or logic 260, 270, 280 or the master control application to use for coordinating the operations 262, 272, 282 under their respective command and control with the physical connections between the coupler and plug banks 240, 290. With reference now to that Figure, the connection table 300' stores first pairing assignment data 310' representative of an association of activation of the second hydraulic circuit of the associated work vehicle coupled with the second service control valve SCV2 as shown in table entry 320' with the physical exercise of the first operation 262 (FIG. 2) of the associated implement as shown in table entry 322', wherein the physical exercise of the first operation 262 of the associated implement is determined by the first operation control application 260 receiving one or more signals from the one or more sensors 264 of the first operation 262. Similarly, the connection table stores second pairing assignment data 312' representative of an association of activation of the first hydraulic circuit of the associated work vehicle coupled with the first service control valve SCV1 as shown in table entry 330' with the physical exercise of the second operation 272 (FIG. 2) of the associated implement as shown in table entry 332', wherein the physical exercise of the second operation 272 of the associated implement is determined by the second operation control application 270 receiving one or more signals from the one or more sensors 274 of the second operation 272. Lastly in the example, the connection table 300' further stores $n^{th}$ pairing assignment data 314' representative of an association of activation of an $n^{th}$ hydraulic circuit of the associated work vehicle coupled with the $n^{th}$ service control valve SCVn as shown in table entry 340' with the physical exercise of the $n^{th}$ operation 282 (FIG. 2) of the associated implement as shown in table entry 342', wherein the physical exercise of the nth operation 282 of the associated implement is determined by the nth operation control application 280 receiving one or more signals from the one or more sensors 284 of the nth operation 282.

It is to be appreciated that the connection table 300' may be stored in any of the operation control applications or logic 260, 270, 280 or may be shared among and/or otherwise distributed between the control applications. Further, the connection table 300' may be copied into each of the control applications or stored in a separate master or supervisory control application or logic to be described in further detail below in connection with a further example embodiment.

In accordance with the example embodiments, the operation control applications 260, 270, 280 use the appropriate connection table 300, 300' in order to properly direct commands to the work vehicle control portion 210 of the system 200 such as, by way of example, the first operation controller 260 desiring to initiate a desired set first fan speed for example may refer to the connection table 300 for the first configuration of the hose bundle described above by way of example in order to verify before sending commands to the hydraulics controller 230 that the first SCV is operatively coupled with the first operation 262, rather than any of the other SCVs such as may occur, for example, by a cross connection of the hydraulic lines 241 extending between the SCV coupler bank 240 on the work vehicle 1 and the SCV plug bank 290 on the implement 2. Similarly, the second operation control application 270 having control over the second operation 272 is instructed by the connection table 300 to send hydraulic command signals to the second SCV rather than any of the other SCVs in accordance with the second pairing assignment data 312. Lastly, the third operation control application 280 may refer to the connection table 300 for instructions and controlling the third operation 282 by using the third SCV rather than any of the other SCVs in accordance with the third pairing assignment data 314.

Further in addition to the above, example embodiments herein are configured to perform automatic directionality confirmation and automatic directionality correction if necessary of the operations during or after the corresponding hydraulic circuits of the tractor 1 are determined and assigned to the respective operations and operation control applications so that the equipment of the various operational units of the implement may be used with high efficiency. By way of example and with reference to FIGS. 2 and 6, the one or more sensor devices 264 are used by the first operation 262 for directionality confirmation, and for directionality correction if necessary, by providing feedback representative of the results in the fan speed of the example embodiment responsive to a commanded hydraulic flow rate being provided to the hydraulics controller 230 by the first operation 262. The first operation control 260 may reverse the logic assignment in the determined SCV for results received from the sensor devices 264 that are opposite from expected result signals such as may occur if the fan is driven backwards by the positive command signal indicating that the SCV pair is physical reversed at the coupler bank. Also, the one or more sensor devices 274 are used by the second operation 272 for directionality confirmation, and for directionality correction if necessary, by providing feedback representative of the results raise/lowed movement in the depth of the burrowing tool of the example embodiment responsive to a commanded hydraulic flow rate being provided to the hydraulics controller 230 by the second operation 272. The second operation control 270 may reverse the logic assignment in the determined SCV for results received from the sensor devices 274 that are opposite from expected result signals such as may occur if the burrowing tool is driven backwards (upwards) by the positive command signal (downward) indicating that the SCV pair is physical reversed at the coupler bank. Similarly also, the one or more sensor devices 284 are used by the nth operation 282 for directionality confirmation, and for directionality correction if necessary, by providing feedback representative of the results in the fold/unfold movement of the implement parts of the example embodiment responsive to a commanded hydraulic flow rate being provided to the hydraulics controller 230 by the nth operation 282. The nth operation control 280 may reverse the logic assignment in the determined SCV for results received from the sensor devices 284 that are opposite from expected result signals such as may occur if the fold/unfold movement of the implement parts are drive backwards such as folding instead of unfolding by the positive command signal (raise or fold) indicating that the SCV pair is physical reversed at the coupler bank. The directionality confirmation or directionality correction logic results may be stored in a table 700 (FIG. 7) for use by the operation control applications 260, 270, 280 to be described in greater detail below.

Still further in addition to the above, example embodiments herein are configured to perform automatic calibration of the operations during or after the corresponding hydraulic circuits of the tractor 1 are determined and assigned to the respective operations and operation control applications so that the equipment of the various operational units of the implement may be used with high efficiency. By way of example and with reference to FIGS. 2 and 4, the first operation 262 may be a product blower 37 (FIG. 1) operation of the pneumatic distribution system 21 driven by a hydraulic motor and that distributes metered product such as seed from the storage tanks 18 to the ground openers 29A, 29B. Automatic calibration of the first operation control application 260 is performed in the example embodiment to relate a nominal predetermined threshold blower speed 410 with a speed command signal level 412 required to realize or otherwise obtain the nominal predetermined threshold blower speed, for example. In the example embodiment, the first operation control application 260 may perform the automatic calibration by sending a series of increasing speed command signals to the hydraulics controller 230 via the implement and work vehicle networks 252, 212, and determining the speed command signal level such as for example 25 gal./min. required to realize or otherwise obtain the nominal predetermined threshold blower speed of 100 RPM using feedback provided by the one or more sensor devices 264 in the form of speed sensors or the like associated with the first operation 262 determining a speed of the blower in revolutions per minute (RPM). The speed command signal level such as for example 25 gal./min. required to realize or otherwise obtain the nominal predetermined threshold blower speed of 100 RPM may be stored in the calibration table 400 of FIG. 4. Also, the slope of the commanded hydraulic flow command versus the fan speed as determined by the sensors may be determined during the automatic calibration sending the series of increasing speed command signals to the hydraulics controller 230 as a calibration parameter of the operation. In that way, sub/supra nominal fan operations may be easily selected by the operator such as "low" and "high" fan command speeds.

The second operation 272 may be provided in the implement 2 for controlling the depth of a burrowing tool such as for example for controlling the depth of the ground openers 29A, 29B of the seed cart 13. Automatic calibration of the second operation control application 270 is performed in the example embodiment to relate a nominal predetermined threshold depth of the ground openers 420, for example with a depth command signal level 422 required to realize or otherwise obtain the nominal predetermined threshold depth of the ground openers. In the example embodiment, the second operation control application 270 may control the automatic calibration by sending a series of increasing depth command signals to the hydraulics controller 230 via the implement and work vehicle networks 252, 212 and determining the depth command signal level such as for example 40 gal./min. required to realize or otherwise obtain the nominal predetermined threshold depth of the ground openers of 1.0 inch using feedback provided by the one or more sensor devices 274 in the form of pressure sensors or the like associated with the second operation 272 determining a pressure exerted by the ground openers 29A, 29B on the ground and indirectly a depth of the ground openers 29A, 29B in the soil in inches. The depth command signal level such as for example 30 gal./min. required to realize or otherwise obtain the nominal predetermined threshold depth of the ground openers of 1.0 inch may be stored in the calibration table 400 of FIG. 4. Also, the slope of the commanded hydraulic flow command versus the pressure or depth as determined by the sensors may be determined during the automatic calibration sending the series of increasing speed command signals to the hydraulics controller 230 as a calibration parameter of the operation. In that way, sub/supra nominal seeder operations may be easily selected by the operator such as "shallow" and "deep" seeder commands.

Also, the nth operation 282 may be, for example, a raise/lower or a fold/unfold operation for moving parts of the implement during use or to transition the parts of the implement between a use mode and storage or transport modes. Automatic calibration of the third operation control application 280 is performed in the example embodiment to relate a nominal predetermined threshold speed or motion time of movement 430 of the articulated parts of the implement, for example with a motion command signal level 432 required to realize or otherwise obtain the nominal predetermined threshold speed or motion time 430 of movement of the articulated parts of the implement. In the above example, the nth operation control application 280 may perform the automatic calibration by sending a series of increasing motion command signals to the hydraulics controller 230 via the implement and work vehicle networks 252, 212, and determining the motion command signal level such as for example 35 gal./min. required to realize or otherwise obtain the nominal predetermined threshold speed or motion time of movement of 3 min. for example of the articulated parts of the implement using feedback provided by the one or more sensor devices 284 in the form of angular position and/or end limit sensors or the like associated with the third operation 282 determining a relative position between a set of articulating parts of the implement. The motion command signal level such as for example 35 gal./min. required to realize or otherwise obtain the nominal predetermined threshold speed or motion time of movement of 3 min. may be stored in the calibration table 400 of FIG. 4. Also, the slope of the commanded hydraulic flow command versus the motion speed or time as determined by the sensors and/or a timer in the controller may be determined during the automatic calibration sending the series of increasing speed command signals to the hydraulics controller 230 as a calibration parameter of the operation. In that way, sub/supra nominal fold/unfold operations may be easily selected by the operator such as "slow" and "fast" command speeds.

In the above example, the first operation control application 260 controls the product blower operation 262 by using the calibration table 400 of FIG. 4 to determine calibrated speed command signals, and sending the calibrated speed command signals to the hydraulics controller 230 via the implement and work vehicle networks 252, 212 and also using feedback provided by the one or more sensor devices 264 in the form of speed sensors or the like associated with the first operation 262 determining a speed of the blower in revolutions per minute (RPM). Similarly, the second operation control application 270 controls the depth of the ground openers 29A, 29B of the seed cart 13 by determining and sending calibrated depth command signals to the hydraulics controller 230 via the implement and work vehicle networks 252, 212 and also using feedback provided by the one or more sensor devices 274 in the form of pressure sensors or the like associated with the second operation 272 determining a pressure exerted by the ground openers 29A, 29B on the ground and indirectly a depth of the ground openers 29A, 29B in the soil in inches. Also in the above example the nth operation control application 280 controls the raise/lower or fold/unfold operations for moving parts of the implement by determining and sending calibrated motion command signals to the hydraulics controller 230 via the implement and work vehicle networks 252, 212 and also using feedback provided by the one or more sensor devices 284 in the form of angular position and/or end limit sensors or the like associated with the third operation 282 determining a relative position between a set of articulating parts of the implement.

Figure 5:
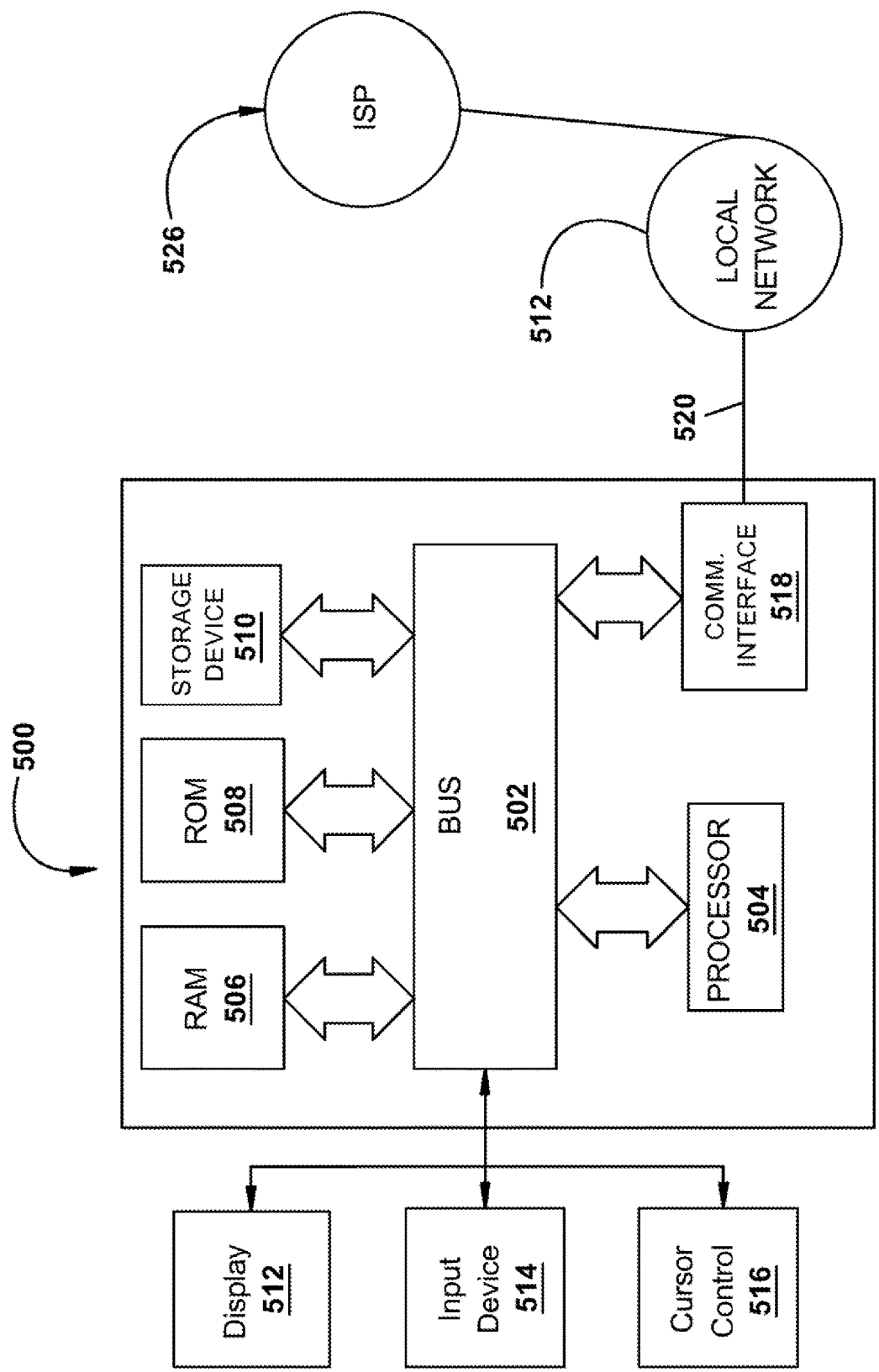
FIG. 5 is a block diagram that illustrates a representative controller according to the example embodiments.

FIG. 5 is a block diagram that illustrates a representative controller 500 according to the example embodiments. Any one or more or all of the operation control applications or logic 220, 230, 260, 270, and 280 discussed above may be provided in accordance with the descriptions of the representative controller 500 as described herein. The controller is suitable for executing embodiments of one or more software systems or modules that perform the automatic SVC configuration detection, and operation assignment, directionality confirmation, and calibration for towable implements towable by work vehicles according to the subject application. The example system includes a bus 502 or other communication mechanism for communicating information, and a processor 504 coupled with the bus for processing information. The computer system includes a main memory, such as random access memory (RAM) 506 or other dynamic storage device for storing information and instructions to be executed by the processor 504, and read only memory (ROM) 508 or other static storage device for storing static information and instructions for the processor 504. A storage device 510 is also suitably provided for storing instructions for execution by the processor, and other information including for example the pairing assignment data 310, 312, 314 representative of the associations of the activation of the hydraulic circuits of the associated work vehicle coupled with the service control valves SCV1, SCV2, SCVn with the physical exercise of the first, second and nth operations 262, 272, 282 (FIG. 2) of the associated implement, and with calibrations of the operations, as shown in the connection tables of FIGS. 3*a*, 3*b*, and 4.

The example embodiments described herein are related to the use of the computer system 500 for controlling the various operations of the work vehicle and of the implement, and also for performing automatic SVC configuration detection, operation assignment, and operation calibration for towable implements towable by work vehicles. According to one implementation, information from commercial and/or internal proprietary resources is provided by computer system 500 in response to the processor 504 executing one or more sequences of one or more instructions contained in main memory 506. Such instructions may be read into main memory 506 from another computer-readable medium, such as storage device 510. Execution of the sequences of instructions contained in main memory 506 causes the processor 504 to perform the process steps described herein. In an alternative implementation, hard-wired circuitry may be used in place of or in combination with software instructions to implement the invention. Thus implementations of the example embodiments are not limited to any specific combination of hardware circuitry, software, logic, or combinations of hardware, software, and/or logic.

In accordance with the descriptions herein, the term "computer-readable medium" as used herein refers to any non-transitory media that participates in providing instructions to the processor 504 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, or any other tangible non-transitory medium from which a computer can read.

In addition and further in accordance with the descriptions herein, the terms "application" and "logic", as used herein with respect to the Figures, include hardware, firmware, software in execution on a machine, and/or combinations of each to perform a function(s) or an action(s), and/or to cause a function or action from another logic, method, and/or system. Applications and logic may include a software controlled microprocessor, a discrete logic (e.g., ASIC), an analog circuit, a digital circuit, a programmed logic device, a memory device containing instructions, and so on. Applications and logic may include one or more gates, combinations of gates, or other circuit components.

The computer system 500 includes a communication interface 518 coupled with the bus 502 which provides a two-way data communication coupling to a network link 520 that is connected to local network 512 of the work vehicle or to the local network 252 of the implement. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. As yet a further example, the communication interface 518 may be a controller area network (CAN) card to provide a data communication connection to a compatible CAN bus 214, 254. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 512 to a diagnostic host computer (not shown) of the like for supporting configuration of the system as desired or necessary. An Internet Service Provider (ISP) 526 may provide data communication services through the Internet 528. Local network 522 and Internet 528 both use electric, electromagnetic or optical signals that carry digital data streams.

The example controller 500 can send messages and receive data, including program code, through the network(s), network link 520 and communication interface 518. In the Internet-connected example embodiment, the controller 500 is operatively connected with a plurality of external public, private, governmental or commercial servers (not shown) configured to execute a web application in accordance with example embodiments. The example controller 500 suitably includes several subsystems or modules to perform the automatic SVC configuration detection, operation assignment, and operation calibration for towable implements towable by work vehicles as set forth herein. A benefit of the subject application is to provide improved intuitive and convenient user interface which allows a user to select and attach various implements to work vehicle SCVs without the need to remember the SCV connections each time the implements are changed so that the Tractor and Implement Apps. match the actual SCV connection scheme, and without the need to spend substantial time in setting up functions in Tractor/Implement Apps. wherein an improper or otherwise incorrect SCV configuration setup may result in an undesirable performance result or unintentional motion or damage to the implement.

Figure 6:
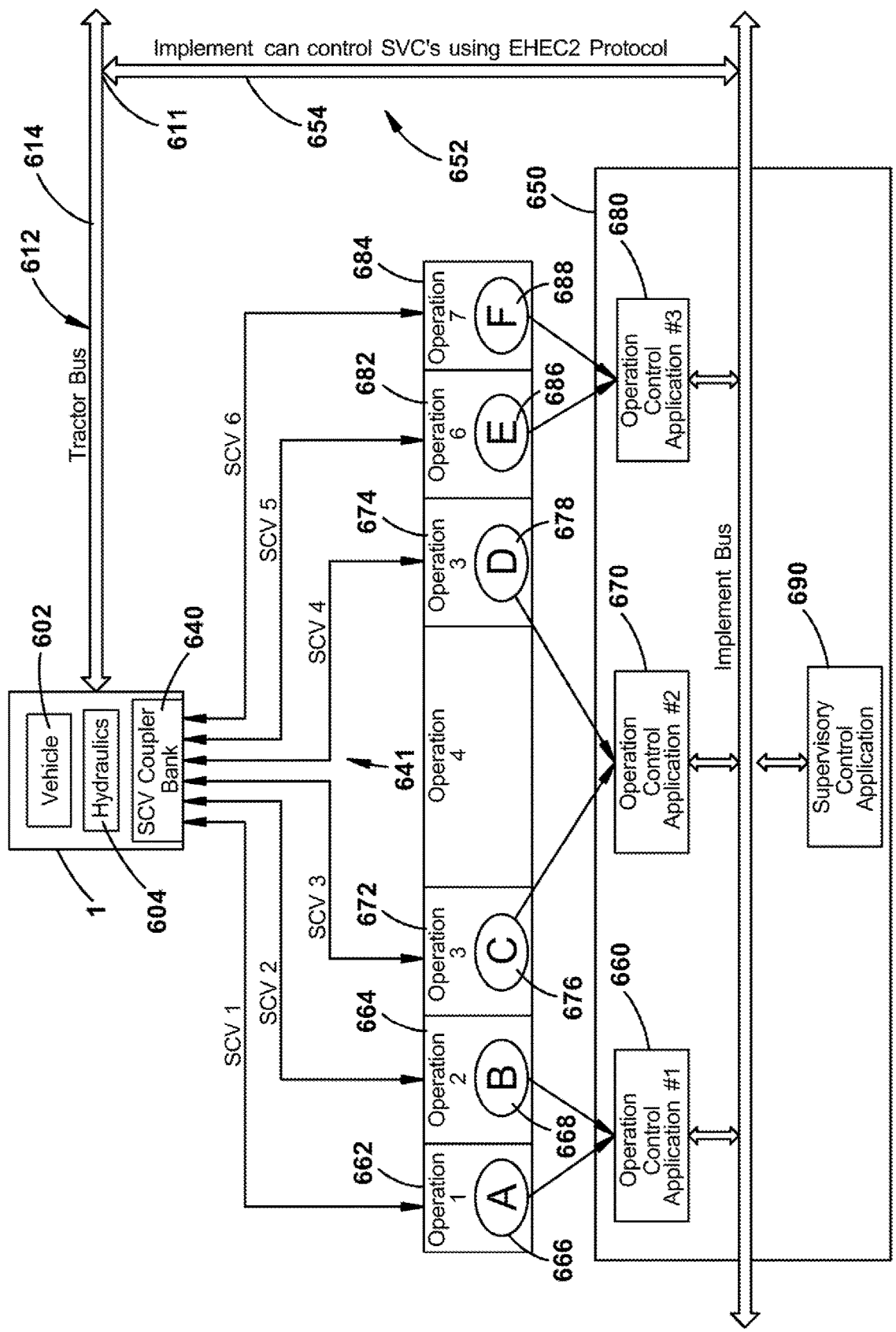
FIG. 6 is a schematic diagram of a control system the tractor/seeder combination of FIG. 1 in accordance with another example embodiment.

FIG. 6 is a schematic diagram of a control system 600 of the tractor/implement shown in FIG. 1. With reference now to that Figure, the control system 600 includes an implement control portion 650 disposed in the implement, and work vehicle and hydraulics controllers 602, 604 disposed in the work vehicle 1. The control system 600 is in operative communication with a work vehicle network 612 including a bus 614 that is provided in the tractor to interface with various components in the tractor such as for example the work vehicle controller 602 and the hydraulics controller 604 of the work vehicle. The work vehicle network 612 can be a Controller Area Network (CAN) or any other equivalent network capable of delivering data and control signals between the various electronic control and data components of the work vehicle. The implement control 650 portion of the system 600 includes an implement network 652 including a bus 654 that is provided for interfacing various components including for example the first, second, and third operation control applications or logic 660, 670, 680, and a supervisory control application or logic 690. The implement network 652 may likewise be a CAN or any other equivalent network capable of delivering data and control signals between the various electronic control and data components of the implement control portion 650. In the embodiment illustrated, the work vehicle network 612 is in operative communication with the implement network 652 via a connection 611 which may be a pluggable connector providing an ability to attach and detach the implement from the work vehicle as may be desired or necessary.

The hydraulic controller 604 of the tractor is operational in the example environment to control functions of the hydraulic power circuits of the tractor 1. In the example illustrated, the hydraulic controller 604 of the tractor generates flows of a pressurized hydraulic fluid for distribution from the tractor 1 to the implement to via an SCV coupler bank 640 provided in an area at the rear of the tractor 1. The coupler bank 640 is connected with the implement via a set of hydraulic connectors and a hose bundle 641. It is to be appreciated that each of the hydraulic circuits of the work vehicle includes a pair of SCVs comprising a connection to a pressurized source of hydraulic fluid provided at a first SCV of each SCV pair, and a corresponding connection to a return for the hydraulic fluid provided at a second SCV of each SCV pair. Since the source and return fittings of the hydraulic circuits have similar form factors and could inadvertently be connected in reverse, the coupler bank 640 includes electromechanical elements for rerouting the hydraulic fluid through the SCV pairs, and logic stored in a memory device and a processor executing the logic for automatically selectively effecting a logical change within the coupler bank 640 route the pressurized sources of the hydraulic fluid to a first SCV of the SCV pair and two route the return of the hydraulic fluid to the other the second SCV of the SCV pair, and vice a versa as may be desired or necessary. The coupler bank 640 may comprise one or more controllers 500 such as described above, for effecting the logical changes in selected SCV pairings to perform the directionality correction if necessary, for example.

The implement control portion 650 of the system 600 is provided on the implement for controlling various operations of the implement such as controlling fan speeds, burrowing tool depths, raise and lower operations, fold and unfold operations, and the like. For this reason, the implement control portion 650 includes one or more operation controllers such as one or more operation control applications including, for example, a first operation control application 660 for controlling first and second operations 662, 664 of the implement, a second operation control application 670 for controlling third and fifth operations 672, 674 of the implement, and a third operation control application 680 for controlling sixth and seventh operations 682, 684 of the implement. By way of example, the first and second operations 662, 664 may be provided for controlling the speed of fans of the implement for delivering seed varieties to the soil. The third and fifth operations 672, 674 may be, for example, provided for controlling the depth of a burrowing tool of the seeder 1. Lastly, the sixth and seventh operations 682, 684 may be provided for controlling fold and unfold operations of one or more booms of the implement 2.

The implement control portion 650 of the system 600 includes an implement network 652 including a bus to 654 that is provided for interfacing various components including for example the operation control applications 660, 670, 680, and also a supervisory control application 690. The implement network 652 can be a CAN or any other equivalent network capable of delivering data and control signals between the various electronic control and data components of the implement control portion 650. In the embodiment illustrated, the implement network 652 is in operative communication with the work vehicle network 612. Connections and/or plugs may be used to provide an ability to attach and detach the implement from the work vehicle as may be desired or necessary. In addition to the above, the implement control portion 650 of the system 600 further includes a plurality of hydraulic hoses in a hose bundle 641 for enabling the functional operational units of the implement to be connected with the several hydraulic power sources disposed in the work vehicle under control of the hydraulics controller within the tractor 1.

In the example embodiment illustrated, the first and second operations 662, 664 of the implement are connected with and obtain power from the first and second hydraulic power sources in the work vehicle via first and second SCV connectors SCV1, SCV2. Similarly in the example embodiment, the third and fifth operations 672, 674 of the implement are connected with and obtain power from the third and fourth hydraulic power sources in the work vehicle via third and fourth SCV connectors SCV3, SCV4. Also similarly in the example embodiment, the sixth and seventh operations 682, 684 of the implement are connected with and obtain power from the sixth and seventh hydraulic power sources in the work vehicle via fifth and sixth SCV connectors SCV5, SCV6.

After automatic SVC configuration detection, automatic operation assignment, automatic directionality confirmation or directionality correction if necessary, and automatic calibration in accordance with the example embodiments and during operation, the first operation controller 660 may issue commands via the implement and work vehicle networks 652, 612 in order to control the hydraulic power sources within the tractor to effectuate desired calibrated and directionally logically correct results at the first and second end operations 662, 664 such as for example to control the speed of fans of the implement for delivering seed varieties to the soil. Similarly, the second operation controller 670 may issue commands via the implement and work vehicle networks 652, 612 in order to control the hydraulic power sources to effectuate desired calibrated and directionally logically correct results at the third and fourth end operations 672, 674 such as for example to control the depth of a burrowing tool of the seeder 1. Also similarly in the example embodiment, the third operation controller 680 may issue one or more commands via the implement and work vehicle networks 652, 612 in order to control the hydraulic power sources to effectuate desired calibrated and directionally logically correct results at the sixth and seventh operations 682, 684 such as for example to control fold and unfold operations of one or more booms of the implement 2.

The supervisory control application 690 executes logic to automatically initialize the system 600 by performing automatic operation assignment, automatic directionality confirmation or directionality correction if necessary, and automatic calibration selective control valve (SVC) configuration procedures. In accordance with the example embodiments herein, the operation controller 660, 670, 680 learn which of the hydraulic circuits of the work vehicle they are coupled to by the supervisory control application 690 issuing a command to the work vehicle via the vehicle and implement networks 612, 652 for the hydraulics controller of the tractor to exercise its hydraulic circuits at the SCV coupler bank 640, wherein the operation controllers 660, 670, 680 report to the supervisory controller 690 movement of one or more apparatus of the various implement operations 662, 664, 672, 674, 682, 684 such as by receiving one or more signals from sensor devices 666, 668, 676, 678, 686, 688 for determining which of the operations of the implement is coupled with which of the hydraulic circuits of the tractor via the SCV connections SCV1-SCV6. Preferably, the supervisory control application 690 issues a sequence of commands to the work vehicle spaced apart in time via the vehicle and implement networks 612, 652 for the hydraulics controller of the tractor to sequentially exercise its first through sixth hydraulic circuits at the SCV coupler bank 640. The operation control applications 660, 670, 680, may then determine which of them are coupled with which one or more of the activated hydraulic circuits of the tractor via SCV1-SCV6.

In the example embodiment, the supervisory control application 690 executes SCV configuration detection logic to issue a first command to the work vehicle via the vehicle and implement networks 612, 652 for the hydraulics controller of the tractor to exercise its first hydraulic circuit at the SCV coupler bank 640 whereupon the first operation control application 660 may detect movement and the direction of the movement for the directionality confirmation or correction as described herein in one or more apparatus of the first operation 662 of the implement using one or more sensor devices 666 disposed in the implement at the first operation. The first operation control application 660 may report the detected movement back to the supervisory control application 690 for the supervisory control application 690 to associate the activation of the first hydraulic circuit SCV1 of the plurality of hydraulic circuits of the associated work vehicle with the physical exercise of the first operation system 662 of the plurality of operation systems 662, 664, 672, 674, 682, 684 of the associated implement, the physical exercise of the first operation system being caused by the activation of the first hydraulic circuit of the associated work vehicle.

The supervisory controller 690 executes the SCV assignment logic stored in a memory device of the supervisory control application 690 to initialize the system 600 by generating pairing assignment and logic data and storing the pairing assignment and logic data in a connection table 700 such as shown in FIG. 7. In this regard, FIG. 7 shows a connection table 700 in accordance with an embodiment for use by operation assignment control logic disposed in one or more of the control devices 660, 670, 680, 690 to use for coordinating the operations 662, 664, 672, 674, 682, 684 under their respective command and control with the physical connections between the coupler and plug banks. With reference now to that Figure, the connection table 700 stores first pairing assignment and logic data 710 representative of an association of activation of a first hydraulic circuit of the associated work vehicle coupled with the first service control valve SCV1 as shown in table entry 720 with the physical exercise of the first operation 662 (FIG. 6) of the associated implement as shown in table entry 722. The first pairing assignment data 710 is also representative of the association of the activation of the first hydraulic circuit of the associated work vehicle in a commanded direction with the physical exercise of the first operation system 662 of the associated implement in the commanded direction as determined by the first control application 660 based on signals received from the one or more sensors 666 at the first operation 662. In the example embodiment, activation of the first hydraulic circuit SCV1 of the associated work vehicle in a commanded direction resulting in the physical exercise of the first operation system 662 of the associated implement in the expected commanded direction is shown by the logical 1 in table entry 721.

Further in addition to the above, the supervisory controller 690 executes automatic calibration logic to perform automatic calibration of the operations during or after the corresponding hydraulic circuits of the tractor 1 are determined and assigned to the respective operations and operation control applications so that the equipment of the various operational units of the implement may be used with high efficiency. By way of example and with reference to FIGS. 6 and 7, the first operation 662 may be a product blower 37 (FIG. 1) operation of the pneumatic distribution system 21 driven by a hydraulic motor and that distributes metered product such as seed from the storage tanks 18 to the ground openers 29A, 29B. Automatic calibration of the first operation control application 660 is performed in the example embodiment to relate a nominal predetermined threshold blower speed 723 with a speed command signal level 724 required to realize or otherwise obtain the nominal predetermined threshold blower speed, for example. In the example embodiment, the first operation control application 660 and/or the supervisory control application 690 may perform the automatic calibration by sending a series of increasing speed command signals to the hydraulics controller 604 via the implement and work vehicle networks 652, 212, and determining the speed command signal level such as for example 25 gal./min. required to realize or otherwise obtain the nominal predetermined threshold blower speed of 100 RPM using feedback provided by the one or more sensor devices 666 in the form of speed sensors or the like associated with the first operation 662 determining a speed of the blower in revolutions per minute (RPM). The speed command signal level such as for example 25 gal./min. required to realize or otherwise obtain the nominal predetermined threshold blower speed of 100 RPM may be stored at entry 724 in the calibration table 700 of FIG. 4.

Also in the example embodiment, the supervisory control application 690 issues a second command to the work vehicle via the vehicle and implement networks 612, 652 for the hydraulics controller of the tractor to exercise its second hydraulic circuit SCV2 at the SCV coupler bank 640 whereupon the first operation control application 660 may detect movement and the direction of the movement for the directionality confirmation or correction as described herein in one or more apparatus of the second operation 664 of the implement using one or more sensor devices 668 disposed in the implement at the second operation. The first operation control application 660 may report the detected movement back to the supervisory control application 690 for the supervisory control application 690 to associate the activation of the second hydraulic circuit of a plurality of hydraulic circuits of the associated work vehicle with the physical exercise of the second operation system 664 of the plurality of operation systems 662, 664, 672, 674, 682, 684 of the associated implement, the physical exercise of the second operation system being caused by the activation of the second hydraulic circuit of the associated work vehicle. The supervisory control application 690 may generate second pairing assignment and logic data 712 and store the second pairing assignment and logic data 712 in the connection table 700. The second pairing assignment and logic data 712 is representative of the association of the activation of the second hydraulic circuit of the associated work vehicle with the physical exercise of the second operation system 664 of the associated implement as determined by the first control application 660 based on signals received from the one or more sensors 668 at the second operation 664. The second pairing assignment data 712 is also representative of the association of the activation of the second hydraulic circuit of the associated work vehicle in a commanded direction with the physical exercise of the second operation system 664 of the associated implement in the reverse of the commanded direction as determined by the first control application 660 based on signals received from the one or more sensors 668 at the second operation 664. In the example embodiment, activation of the second hydraulic circuit SCV2 of the associated work vehicle in a commanded direction resulting in the physical exercise of the second operation system 664 of the associated implement in the unexpected reverse commanded direction is shown by the logical −1 in table entry 731.

Also in the example embodiment, the supervisory controller 590 issues a third command to the work vehicle via the vehicle and implement networks 612, 652 for the hydraulics controller 604 of the tractor to exercise its second hydraulic circuit at the SCV coupler bank 640 whereupon the second operation control application 670 may detect movement and the direction of the movement for the directionality confirmation or correction as described herein in one or more apparatus of the third operation 672 of the implement using one or more sensor devices 676 disposed in the implement at the third operation. The second operation control application 670 may report the detected movement back to the supervisory control application 690 for the supervisory control application 690 to associate the activation of the third hydraulic circuit of a plurality of hydraulic circuits of the associated work vehicle with the physical exercise of the third operation system 672 of the plurality of operation systems 662, 664, 672, 674, 682, 684 of the associated implement, the physical exercise of the third operation system being caused by the activation of the third hydraulic circuit of the associated work vehicle. The supervisory control application 690 may generate third pairing assignment and logic data 714 and store the third pairing assignment and logic data 714 in the connection table 700. The third pairing assignment and logic data 714 is representative of the association of the activation of the third hydraulic circuit of the associated work vehicle with the physical exercise of the third operation system 672 of the associated implement as determined by the second control application 670 based on signals received from the one or more sensors 676 at the third operation 672. The third pairing assignment data 714 is also representative of the association of the activation of the third hydraulic circuit of the associated work vehicle in a commanded direction with the physical exercise of the third operation system 672 of the associated implement in the commanded direction as determined by the second control application 670 based on signals received from the one or more sensors 676 at the third operation 672. In the example embodiment, activation of the third hydraulic circuit SCV3 of the associated work vehicle in a commanded direction resulting in the physical exercise of the first operation system 672 of the associated implement in the expected commanded direction is shown by the logical 1 in table entry 741.

Further in addition to the above, the supervisory controller 690 executes automatic calibration logic to perform automatic calibration of the operations during or after the corresponding hydraulic circuits of the tractor 1 are determined and assigned to the respective operations and operation control applications so that the equipment of the various operational units of the implement may be used with high efficiency. By way of example and with reference to FIGS. 6 and 7, the third operation 672 may be provided in the implement 2 for controlling the depth of a burrowing tool such as for example for controlling the depth of the ground openers 29A, 29B of the seed cart 13. Automatic calibration of the second control application 670 is performed in the example embodiment to relate a nominal predetermined threshold depth of the ground openers 420, for example with a depth command signal level 422 required to realize or otherwise obtain the nominal predetermined threshold depth of the ground openers. In the example embodiment, the second control application 670 may control the automatic calibration by sending a series of increasing depth command signals to the hydraulics controller 604 via the implement and work vehicle networks 652, 612 and determining the depth command signal level such as for example 40 gal./ min. required to realize or otherwise obtain the nominal predetermined threshold depth of the ground openers of 1.0 inch using feedback provided by the one or more sensor devices 676 in the form of pressure sensors or the like associated with the second operation 672 determining a pressure exerted by the ground openers 29A, 29B on the ground and indirectly a depth of the ground openers 29A, 29B in the soil in inches. The depth command signal level such as for example 40 gal./min. required to realize or otherwise obtain the nominal predetermined threshold depth of the ground openers of 1.0 inch may be stored in the calibration table 700 of FIG. 7.

Still further in the example embodiment, the supervisory control application 690 issues a fourth command to the work vehicle via the vehicle and implement networks 612, 652 for the hydraulics controller of the tractor to exercise its fourth hydraulic circuit SCV4 at the SCV coupler bank 640 whereupon the second operation control application 670 may detect movement and the direction of the movement for the directionality confirmation or correction as described herein in one or more apparatus of the fifth operation 674 of the implement using one or more sensor devices 678 disposed in the implement at the fifth operation. The second operation control application 670 may report the detected movement back to the supervisory control application 690 for the supervisory control application 690 to associate the activation of the fourth hydraulic circuit of the plurality of hydraulic circuits of the associated work vehicle with the physical exercise of the fifth operation system 674 of the plurality of operation systems 662, 664, 672, 674, 682, 684 of the associated implement, the physical exercise of the fifth operation system being caused by the activation of the fourth hydraulic circuit of the associated work vehicle. The supervisory control application 690 may generate fourth pairing assignment and logic data 716 and store the fourth pairing assignment and logic data 716 in the connection table 700. The fourth pairing assignment and logic data 716 is representative of the association of the activation of the fourth hydraulic circuit of the associated work vehicle with the physical exercise of the fifth operation system 674 of the associated implement as determined by the second control application 670 based on signals received from the one or more sensors 678 at the fifth operation 674. The fourth pairing assignment data 716 is also representative of the association of the activation of the fourth hydraulic circuit of the associated work vehicle in a commanded direction with the physical exercise of the fifth operation system 674 of the associated implement in the reverse of the commanded direction as determined by the second control application 670 based on signals received from the one or more sensors 678 at the fifth operation 674. In the example embodiment, activation of the fourth hydraulic circuit SCV4 of the associated work vehicle in a commanded direction resulting in the physical exercise of the fifth operation system 674 of the associated implement in the unexpected reverse commanded direction is shown by the logical −1 in table entry 751.

Yet still further in the example embodiment, the supervisory control application 690 issues a fifth command to the work vehicle via the vehicle and implement networks 612, 652 for the hydraulics controller of the tractor to exercise its fifth hydraulic circuit SCV5 at the SCV coupler bank 640 whereupon the third operation control application 680 may detect movement and the direction of the movement for the directionality confirmation or correction as described herein in one or more apparatus of the sixth operation 682 of the implement using one or more sensor devices 686 disposed in the implement at the sixth operation. The third operation control application 680 may report the detected movement back to the supervisory control application 690 for the supervisory control application 690 to associate the activation of the fifth hydraulic circuit of a plurality of hydraulic circuits of the associated work vehicle with the physical exercise of the sixth operation system 682 of the plurality of operation systems 662, 664, 672, 674, 682, 684 of the associated implement, the physical exercise of the sixth operation system being caused by the activation of the fifth hydraulic circuit of the associated work vehicle. The supervisory control application 690 may generate fifth pairing assignment and logic data 718 and store the fifth pairing assignment and logic data 718 in the connection table 700. The fifth pairing assignment and logic data 718 is representative of the association of the activation of the fifth hydraulic circuit of the associated work vehicle with the physical exercise of the sixth operation system 682 of the associated implement as determined by the third control application 680 based on signals received from the one or more sensors 686 at the sixth operation 682. The fifth pairing assignment data 718 is also representative of the association of the activation of the fifth hydraulic circuit of the associated work vehicle in a commanded direction with the physical exercise of the sixth operation system 682 of the associated implement in the commanded direction as determined by the third control application 680 based on signals received from the one or more sensors 686 at the sixth operation 682. In the example embodiment, activation of the fifth hydraulic circuit SCV5 of the associated work vehicle in a commanded direction resulting in the physical exercise of the sixth operation system 682 of the associated implement in the expected commanded direction is shown by the logical 1 in table entry 761.

Further in addition to the above, the supervisory control application 690 executes automatic calibration logic to perform automatic calibration of the operations during or after the corresponding hydraulic circuits of the tractor 1 are determined and assigned to the respective operations and operation control applications so that the equipment of the various operational units of the implement may be used with high efficiency. The automatic calibration logic may also be executed to perform the automatic calibration of the operations during or after the automatic directionality confirmation and selective directionality correction is made as described above. By way of example and with reference to FIGS. 6 and 7, the sixth operation 682 may be provided in the implement 2 for providing a raise/lower or a fold/unfold operation for moving parts of the implement during use or to transition the parts of the implement between a use mode and storage or transport modes. Automatic calibration of the third operation control application 680 is performed in the example embodiment to relate a nominal predetermined threshold speed or motion time of movement 763 of the articulated parts of the implement, for example with a motion command signal level 764 required to realize or otherwise obtain the nominal predetermined threshold speed or motion time 763 of movement of the articulated parts of the implement. In the above example, the third operation control application 680 may perform the automatic calibration by sending a series of increasing motion command signals to the hydraulics controller 604 via the implement and work vehicle networks 652, 612, and determining the motion command signal level such as for example 35 gal./min. required to realize or otherwise obtain the nominal predetermined threshold speed or motion time of movement of 3 min. for example of the articulated parts of the implement using feedback provided by the one or more sensor devices 686 in the form of angular position and/or end limit sensors or the like associated with the sixth operation 682 determining a relative position between a set of articulating parts of the implement. The motion command signal level such as for example 35 gal./min. required to realize or otherwise obtain the nominal predetermined threshold speed or motion time of movement of 3 min. may be stored in the calibration table 700 of FIG. 7.

Yet still again further in the example embodiment, the supervisory control application 690 issues a sixth command to the work vehicle via the vehicle and implement networks 612, 652 for the hydraulics controller of the tractor to exercise its sixth hydraulic circuit SCV6 at the SCV coupler bank 640 whereupon the third operation control application 680 may detect movement and the direction of the movement for the directionality confirmation or correction as described herein in one or more apparatus of the seventh operation 684 of the implement using one or more sensor devices 688 disposed in the implement at the seventh operation. The third operation control application 680 may report the detected movement back to the supervisory control application 690 for the supervisory control application 690 to associate the activation of the sixth hydraulic circuit of a plurality of hydraulic circuits of the associated work vehicle with the physical exercise of the seventh operation system 684 of the plurality of operation systems 662, 664, 672, 674, 682, 684 of the associated implement, the physical exercise of the seventh operation system being caused by the activation of the sixth hydraulic circuit of the associated work vehicle. The supervisory control application 690 may generate sixth pairing assignment and logic data 719 and store the sixth pairing assignment and logic data 719 in the connection table 700. The sixth pairing assignment and logic data 719 is representative of the association of the activation of the sixth hydraulic circuit of the associated work vehicle with the physical exercise of the seventh operation system 684 of the associated implement as determined by the third control application 680 based on signals received from the one or more sensors 688 at the seventh operation 684. The sixth pairing assignment data 719 is also representative of the association of the activation of the sixth hydraulic circuit of the associated work vehicle in a commanded direction with the physical exercise of the seventh operation system 684 of the associated implement in the commanded direction as determined by the third control application 680 based on signals received from the one or more sensors 688 at the seventh operation 684. In the example embodiment, activation of the sixth hydraulic circuit SCV6 of the associated work vehicle in a commanded direction resulting in the physical exercise of the seventh operation system 684 of the associated implement in the expected commanded direction is shown by the logical 1 in table entry 771.

In accordance with an embodiment, the operation control applications 660, 670, 680, 690 may use the connection table 700 in order to properly direct commands to the work vehicle such as, by way of example, the first operation control application 660 desiring to initiate a desired set first fan speed for example may refer to the connection table 700 before sending commands to the hydraulics controller of the tractor in order to verify the connection logic of the first SCV and also that the first SCV is operatively coupled with the first operation 662, rather than any of the other SCVs such as may occur, for example, by a cross connection of the hydraulic lines extending between the work vehicle and the implement. Similarly, the second operation control application 670 having control over the third and fifth second operations 672, 674 is instructed or otherwise informed by the connection table 700 to send hydraulic command signals to the third and fifth SCVs in accordance with the directionality logical values in table entries 741 and 751, and in accordance with the third and fourth pairing data 714, 716. Lastly, the third operation control application 680 may refer to the connection table 700 for instructions and controlling the sixth and seventh operations 682, 684 by using the fifth and sixth SCVs in accordance with the directionality logical values in table entries 761 and 771, and in accordance with the fifth and sixth pairing assignment data 718, 719.

Figure 8:
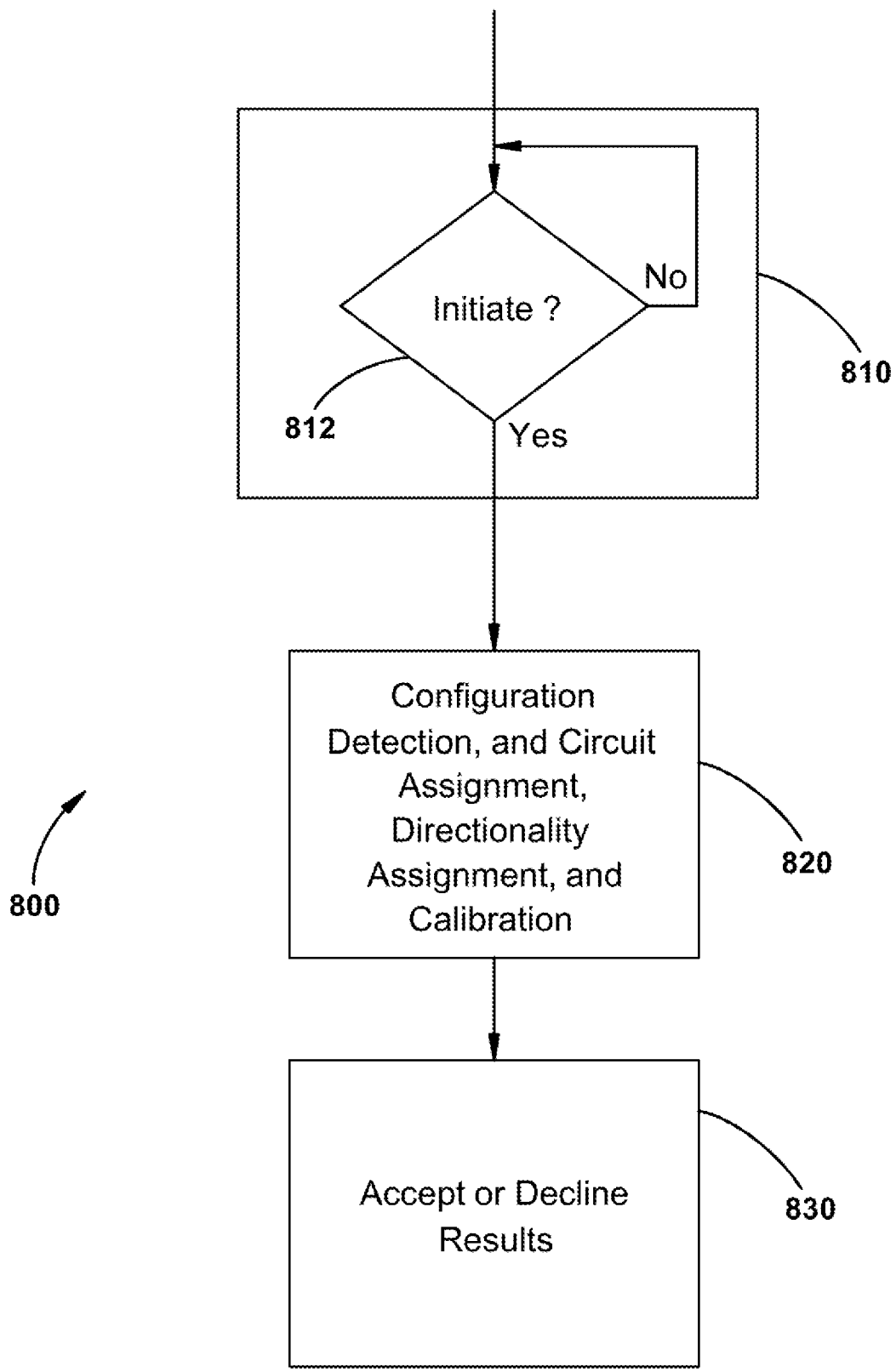
FIG. 8 is a flow diagram illustrating a method of automatic control valve (SVC) configuration detection, and circuit assignment, directionality confirmation, and calibration in accordance with an example embodiment.

FIG. 8 is a flow diagram illustrating a method 800 of automatic SCV configuration detection, and operation assignment, directionality confirmation, and calibration in accordance with an example embodiment. The method 800 includes a first step 810 wherein it is determined whether to initiate the automated SVC detection and configuration method. The method may be initiated by one or more trigger events such as, for example, the unplugging of one or more of the bundle of hydraulic lines 241, 641 from the coupler bank 240, 640 or by initiation by starting the tractor after first installing the implement. In step 812, it is determined whether to initiate the automated automatic control valve configuration detection, and assignment, directionality confirmation, and calibration protocol. If initiation is to take place, the method proceeds to step 820 where at the automated automatic control valve configuration detection, and assignment, directionality confirmation, and calibration protocol is executed. After the automatic control valve configuration detection, and assignment, directionality confirmation, and calibration method is executed at step 780, the results are presented to the tractor operator at step 830 for the operator to provide input either excepting the results or declining to except the results whereby a manual configuration may be performed.

Figure 9:
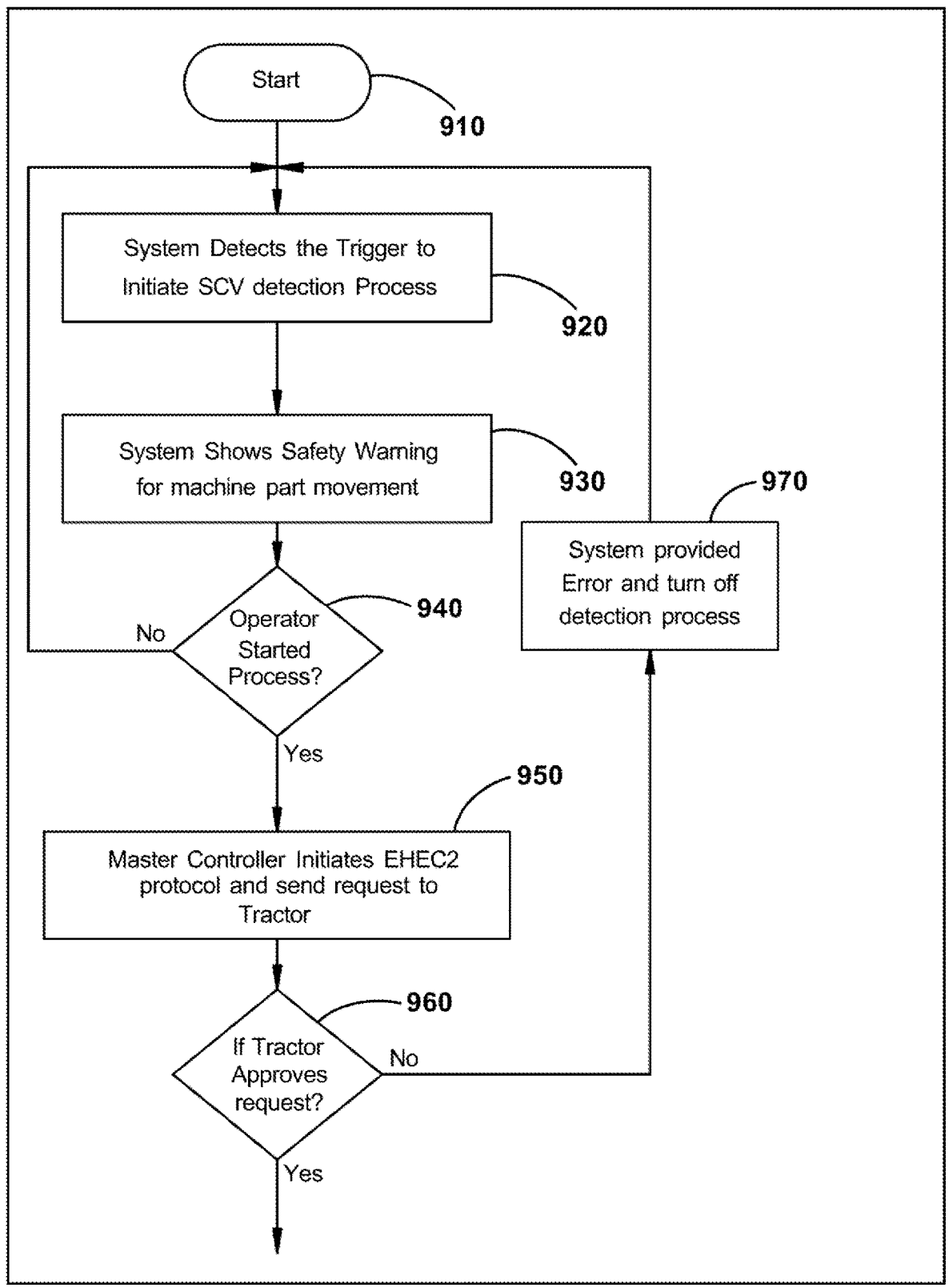
FIG. 9 is a flow diagram illustrating a first portion of the method of automatic SVC configuration detection, and circuit assignment, directionality confirmation, and calibration of FIG. 8 shown in greater detail in accordance with an example embodiment.
Figure 12:
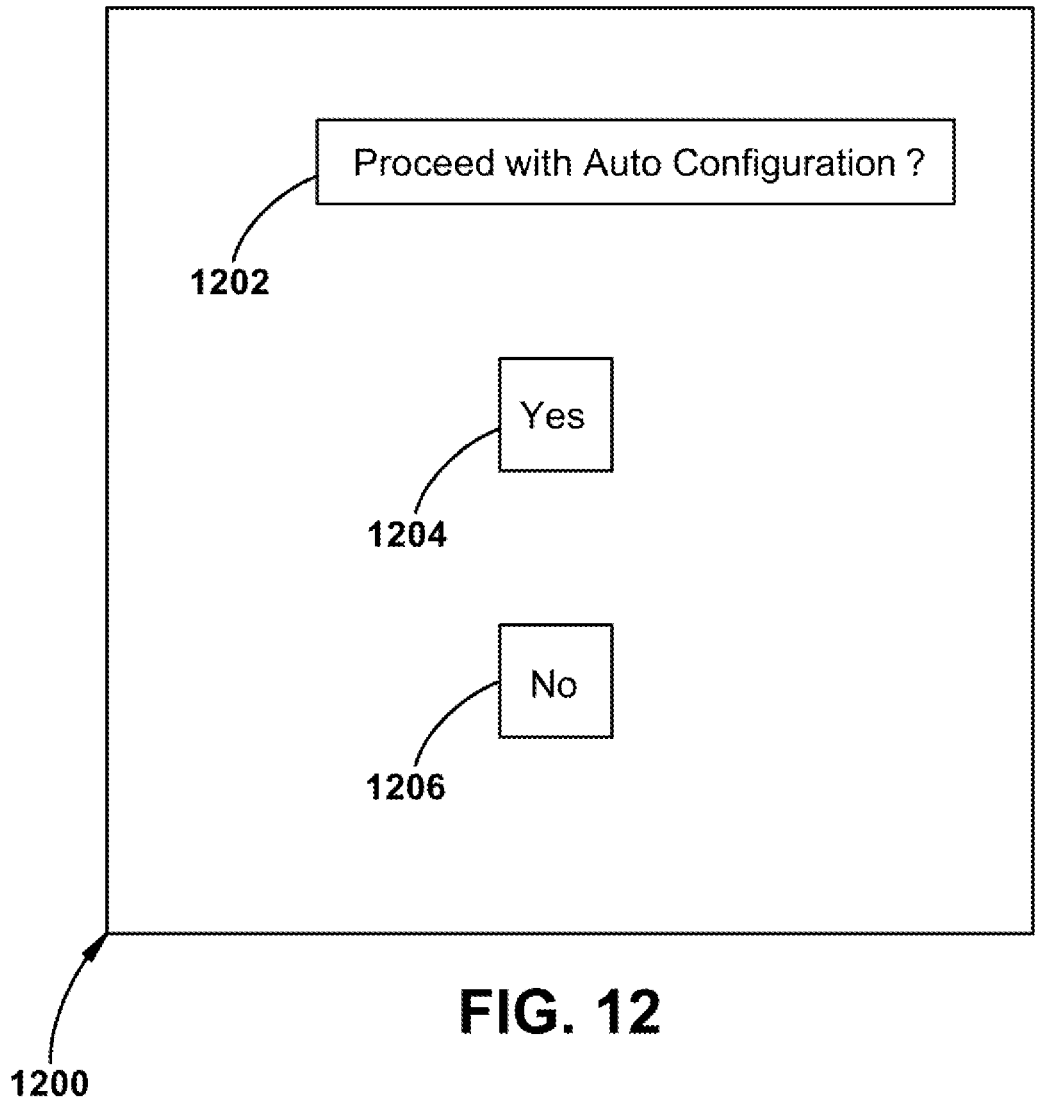
FIG. 12 is a plan view showing icons for presentation to a human operator for providing feedback by the operator to initiate the method of automatic SVC configuration detection, and circuit assignment, directionality confirmation, and calibration of FIG. 8 in accordance with an example embodiment.

The details of the initiation step 810 in accordance with an embodiment is best shown in FIG. 9 which begins at step 910 followed by a detection by the system of one or more trigger events at step 920 to initiate the automated method of SVC configuration detection, and assignment, directionality confirmation, and calibration. The system may display a safety warning or the like that step 930 for notifying the operator that one or more machine components maybe moved on the implement during the course of the automated configuration detection, and assignment, directionality confirmation, and calibration. The warning message may be displayed, for example, on the display 512 (FIG. 5) or the lake. An example of a message is shown by way of example in FIG. 12 whereat a display screen 1200 is illustrated. The operator is prompted at 1202 on whether to proceed with the automated configuration. The operator may select an icon at 1204 in order to initiate the automated detection and configuration. Alternatively, the operator may select another icon 1206 in order to decline the automated detection and configuration.

Turning back now to FIG. 9, if the operator decides to proceed as determined at step 940 with the automated detection and configuration, the system advances to step 950 for the master control application 690 to initiate a protocol for sending requests to the tractor for activating the various hydraulic circuits one at a time. At step 960 feedback is provided by the control system 220 of the associated work vehicle for determining on whether to proceed with the automated detection and configuration. If the tractor is either incapable or unable to execute the commands under the control of the master control application 690, the system provides an error to the operator at step 970 and terminates the automated configuration detection, assignment, and calibration.

Figure 10:
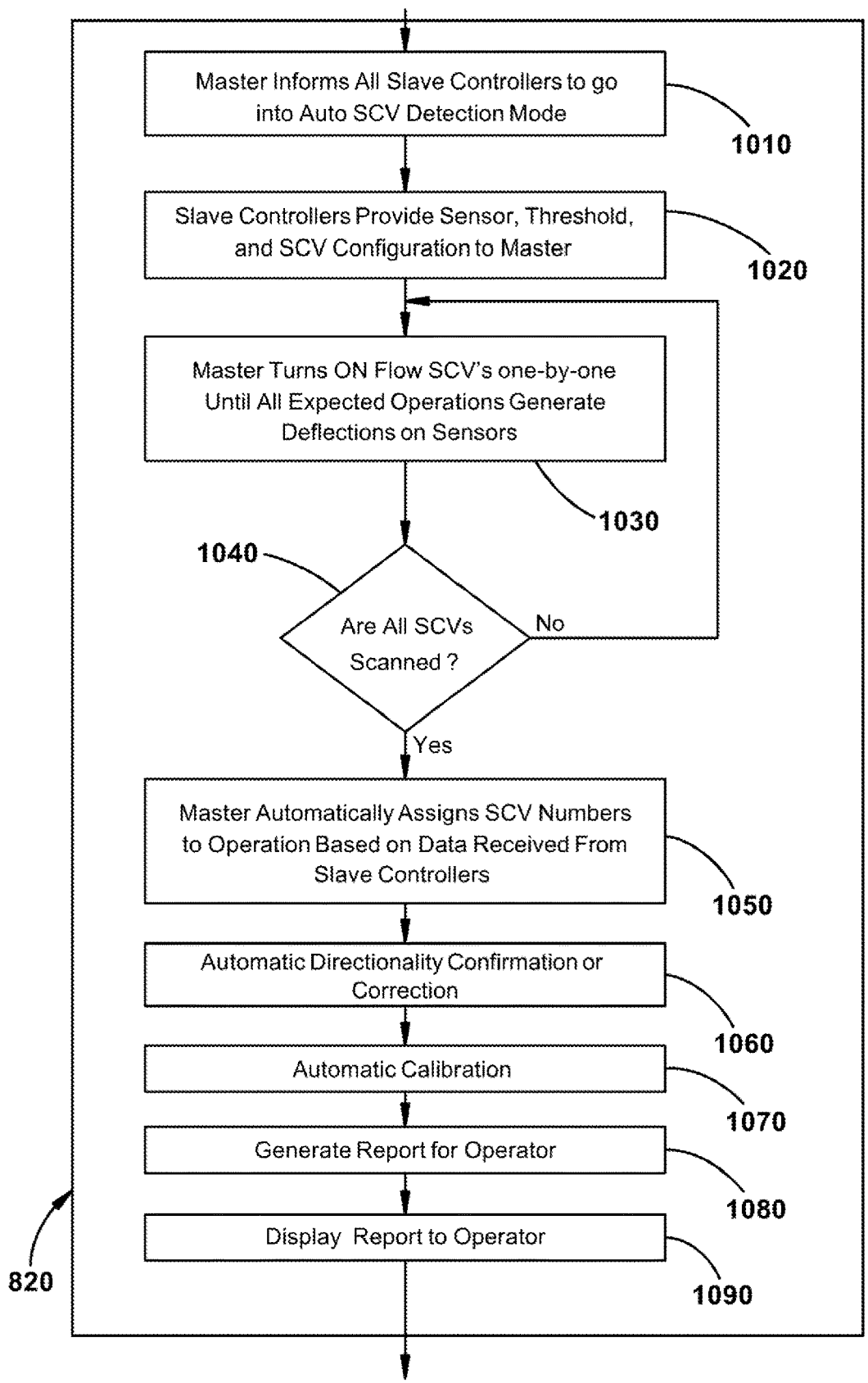
FIG. 10 is a flow diagram illustrating a second portion of the method of automatic SVC configuration detection, and circuit assignment, directionality confirmation, and calibration of FIG. 8 shown in greater detail in accordance with an example embodiment.

The automated configuration detection, assignment, directionality confirmation or correction, and calibration step 820 is illustrated in greater detail in FIG. 10 whereat as can be seen at step 1010, the master control application 690, or one of the operation control applications 260, 270, 280 of FIG. 2 acting as a master control application, informs all of the operation control applications or slave controllers 660, 670, 680, or others of the operation control applications 260, 270, 280 of FIG. 2 not acting as a master control application, to transition into a suitable mode for the automated detection and configuration. The slave controllers provide sensor, threshold, and configuration information to the master controller at step 1020. Thereafter, the master controller executes commands for initiating hydraulic fluid flows through each of the control valves on the tractor one by one until all expected operations generate deflections on the sensors at the various operational units on the implement at step 1030.

In one example embodiment, after all of the control valves are automatically scanned as determined at step 1040, the master control application 690 assigns control valve numbers to the operational units and the implement based on the data received back from the slave controllers at step 1050. In another equivalent embodiment, the master control application 690 assigns control valve numbers to the operational units and the implement based on the data received back from the slave controllers at the time the data is received back from the slave controllers. That is, in this example embodiment, the steps 1030, 1040, and 1050 may be performed essentially at the same time or in several sequential loops, one for each of the controllers in the system. In that way the controllers need not wait for the completion of soliciting each of the SCVs activations, but instead may fill in the connection table as the sequencing progresses.

The automatic directionality confirmation or directionality correction for each of the operations and operation control applications and controllers as described herein is performed in step 1060. The directionality confirmation or correction results are stored in a connection table that may be stored in any of the operation control applications or logic or may be shared among and/or otherwise distributed between or across the control applications.

The automatic calibration of each of the operations and operation control applications and controllers as described herein is performed in step 1070. The calibration results are stored in a connection table that may be stored in any of the operation control applications or logic or may be shared among and/or otherwise distributed between or across the control applications.

Figure 13:
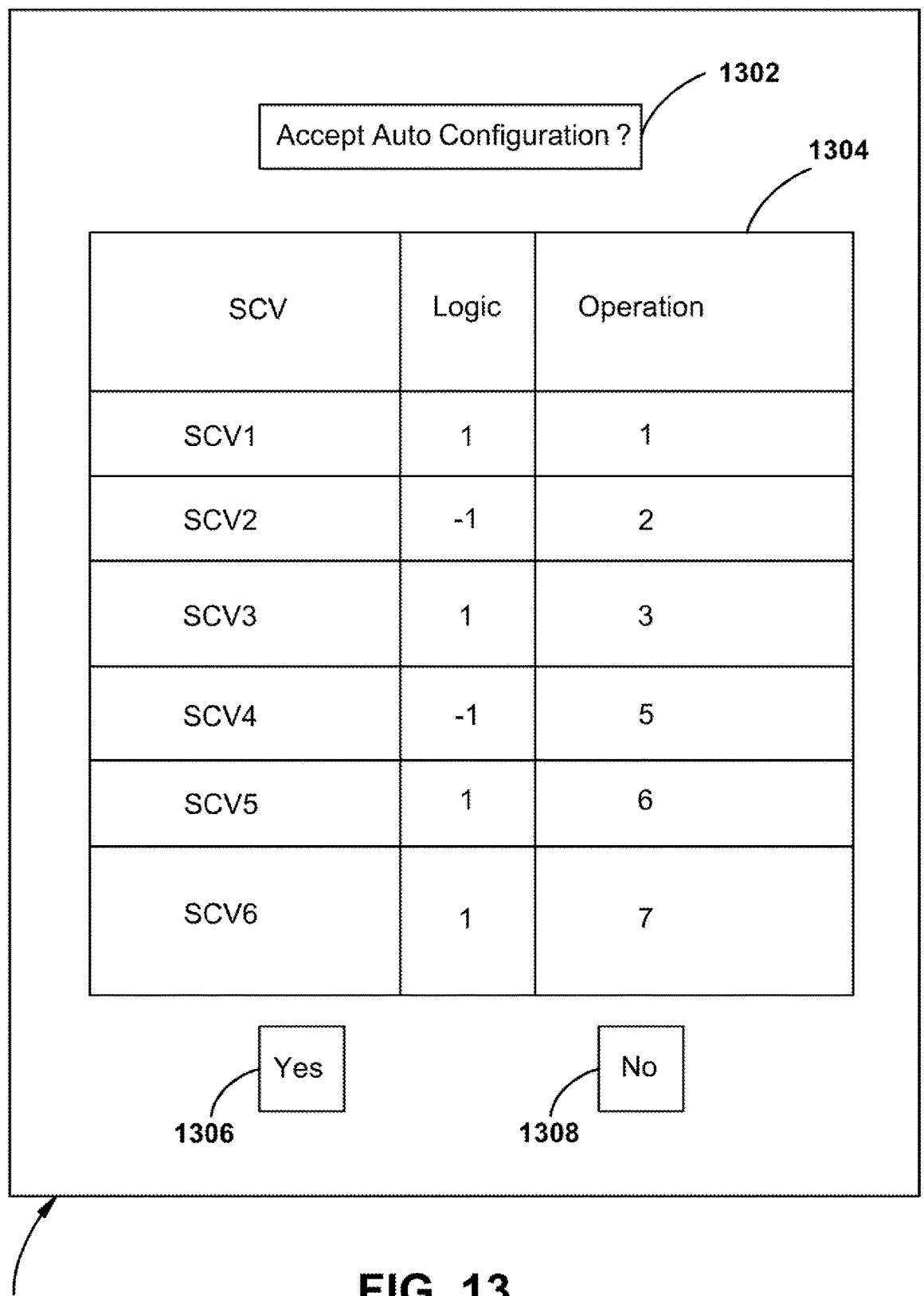
FIG. 13 is a plan view showing icons for presentation to a human operator for providing feedback by the operator to accept and use the results of the method of automatic SVC configuration detection, and circuit assignment, directionality confirmation, and calibration of FIG. 8 in accordance with an example embodiment.

A report may be generated for displaying on a suitable display to the operator such as shown in FIG. 13. The report is generated at step 1080 and displayed to the operator in step 1090. The report may be displayed, for example, on the display unit 512 (FIG. 5) for viewing of the configuration chart to the operator. It is to be appreciated that the chart 1300 as shown in FIG. 13 may include much of the same information as contained in the table 700 shown in FIG. 7 and described above. The operator is provided with the opportunity to accept or decline the automated configuration. The operator is prompted by a prompt icon 1302 for selection at an affirmative icon 1306 or a declination at icon 1308.

Figure 11:
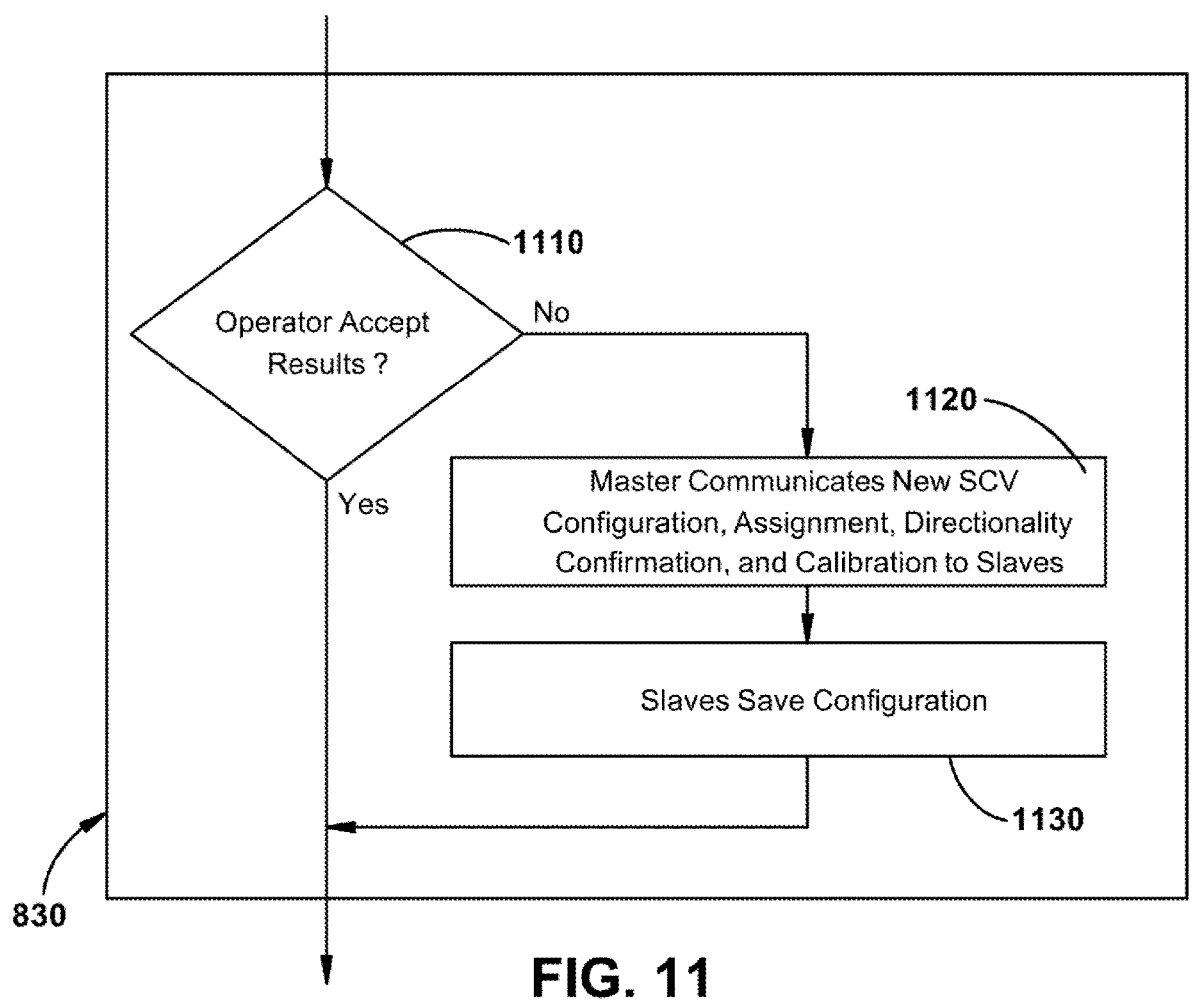
FIG. 11 is a flow diagram illustrating a third portion of the method of automatic SVC configuration detection, and circuit assignment, directionality confirmation, and calibration of FIG. 8 shown in greater detail in accordance with an example embodiment.

FIG. 11 is a flow diagram illustrating a third portion 830 of the method of automatic SVC configuration detection, and circuit assignment, directionality confirmation, and calibration of FIG. 8 shown in greater detail in accordance with an example embodiment. The operator may in step 1110 accept the automated configuration, assignment, directionality confirmation or correction, and calibration described herein and presented to the operator using the affirmative icon 1306 or, also in step 1110, decline the automated configuration, assignment, directionality confirmation or correction, and calibration results using the declination at icon 1308. If the automated configuration, assignment, directionality confirmation or correction, and calibration results is not accepted, the method automatically repeats in step 1120 the steps described above for reassessing and/or re-determining the configuration, assignment, directionality confirmation or correction, and calibration. In step 1130 the results of the automatic reassessing and/or re-determining of the configuration, assignment, directionality confirmation or correction, and calibration are stored in any of the operation control applications or logic or may be shared among and/or otherwise distributed between or across the control applications as described herein.

It is to be understood that other embodiments will be utilized and structural and functional changes will be made without departing from the scope of the present invention. The foregoing descriptions of embodiments of the present invention have been presented for the purposes of illustration and description. It is not intended to be exhaustive or to limit the invention to the precise forms disclosed. Accordingly, many modifications and variations are possible in light of the above teachings. It is therefore intended that the scope of the invention be limited not by this detailed description.

The invention claimed is:

1. A system for automatic configuration detection and assignment of control of a plurality of hydraulic circuits of an associated work vehicle to a plurality of operation systems of an associated implement operatively coupled with the associated work vehicle, the system comprising:
a supervisory control unit operatively coupled with an associated implement communication network of the associated implement, the supervisory control unit comprising:
a processor;
a memory device operatively coupled with the processor; and
logic stored in the memory device, the logic being executable by the processor to:
determine a physical exercise of a first operation system of the plurality of operation systems of the associated implement caused by an activation of a first hydraulic circuit of the plurality of hydraulic circuits of the associated work vehicle; and
generate first pairing assignment data representative of the detected physical exercise of the first operation system caused by the activation of the first hydraulic circuit, wherein the first hydraulic circuit of the plurality of hydraulic circuits of the associated work vehicle is assigned to a first operation control application based on the first pairing assignment data for control by the first operation control application of the first operation system of the associated implement using the first hydraulic circuit of the associated work vehicle.

2. The system according to claim 1, wherein the logic is further executable by the processor to:
detect a physical exercise of a second operation system of the plurality of operation systems of the associated implement caused by an activation of a second hydraulic circuit of the plurality of hydraulic circuits of the associated work vehicle; and
generate second pairing assignment data representative of the detected physical exercise of the second operation system caused by the activation of the second hydraulic circuit, wherein the second hydraulic circuit of the plurality of hydraulic circuits of the associated work vehicle is assigned to a second operation control application based on the second pairing assignment data for control by the second operation control application of the second operation system of the associated implement using the second hydraulic circuit of the associated work vehicle.

3. The system according to claim 2, wherein the supervisory control unit further comprises:
exercise control logic stored in the memory device, the exercise control logic being executable by the processor to:
generate first trial energization command data comprising a first trial energization instruction executable by an associated work vehicle control unit of the associated work vehicle to activate the first hydraulic circuit to deliver a first hydraulic pressure to an $i^{th}$ operation system of the associated implement operatively coupled with the first hydraulic circuit; and
generate second trial energization command data comprising a second trial energization instruction executable by the associated work vehicle control unit of the associated work vehicle to activate the second hydraulic circuit to deliver a second hydraulic pressure to a $k^{th}$ operation system of the associated implement operatively coupled with the second hydraulic circuit,
wherein the supervisory control unit operates to:
communicate the first trial energization command data to the associated work vehicle control unit of the associated work vehicle via the associated implement communication network to cause the first hydraulic circuit of the plurality of hydraulic circuits of the associated work vehicle to activate to deliver the first hydraulic pressure to the $i^{th}$ operation system of the associated implement operatively coupled with the first hydraulic circuit; and
communicate the second trail energization command data to the associated work vehicle control unit of the associated work vehicle via the associated implement communication network to cause the second hydraulic circuit of the plurality of hydraulic circuits of the associated work vehicle to activate to deliver the second hydraulic pressure to the $k^{th}$ operation system of the associated implement operatively coupled with the first hydraulic circuit.

4. The system according to claim 3, wherein the supervisory control unit operates to:
receive from the $i^{th}$ operation system of the associated implement via the associated implement communication network first movement verification data representative of a physical exercise of the $i^{th}$ operation system of the associated implement responsive to the communication circuit communicating the first trial movement command data to the associated work vehicle control unit to activate the first hydraulic circuit of the plurality of hydraulic circuits of the associated work vehicle causing a first physical trial movement of the $i^{th}$ operation system of the associated implement; and receive from the $k^{th}$ operation system of the associated implement via the associated implement communication network second movement verification data representative of a physical exercise of the $k^{th}$ operation system of the associated implement responsive to the communication circuit communicating the second trial movement command data to the associated work vehicle control unit to activate the second hydraulic circuit of the plurality of hydraulic circuits of the associated work vehicle causing a second physical trial movement of the $k^{th}$ operation system of the associated implement.

5. The system according to claim 3, wherein:

the logic is executable by the processor to:
  determine the $i^{th}$ operation system to be the first operation system of the associated implement based on receiving the first movement verification data from the $i^{th}$ operation system of the associated implement in response to communicating the first trial energization command data to the associated work vehicle control unit of the associated work vehicle;
  determine the $k^{th}$ operation system to be the second operation system of the associated implement based on receiving the second movement verification data from the $k^{th}$ operation system of the associated implement in response to communicating the second trial energization command data to the associated work vehicle control unit of the associated work vehicle;
  generate the first pairing assignment data representative of the association of the activation of the first hydraulic circuit of the associated work vehicle with the physical exercise of the $i^{th}$ operation system of the associated implement;
  generate the second pairing assignment data representative of the association of the activation of the second hydraulic circuit of the associated work vehicle with the physical exercise of the $k^{th}$ operation system of the associated implement;
  communicate the first pairing assignment data to an $i^{th}$ operation control unit of the $i^{th}$ operation system of the associated implement via the associated implement communication network, wherein the first hydraulic circuit of the plurality of hydraulic circuits of the associated work vehicle is assigned to the $i^{th}$ operation control unit based on the first pairing assignment data for control by the $i^{th}$ operation control unit of the first operation system of the associated implement using the first hydraulic circuit of the associated work vehicle; and
  communicate the second pairing assignment data to a $k^{th}$ operation control unit of the $k^{th}$ operation system of the associated implement via the associated implement communication network operatively coupling the $k^{th}$ operation control unit with the hydraulic circuit assignment control unit, wherein the second hydraulic circuit of the plurality of hydraulic circuits of the associated work vehicle is assigned to the $k^{th}$ operation control unit based on the second pairing assignment data for control by the second operation control unit of the second operation system of the associated implement using the second hydraulic circuit of the associated work vehicle.

6. The system according to claim 2, wherein the supervisory control unit further comprises:

exercise interlock control logic stored in the memory device, the exercise interlock control logic being executable by the processor to:
selectively communicate the first and second trial energization command data to the associated work vehicle control unit of the associated work vehicle in response to the exercise interlock control logic receiving an exercise confirmation signal from an associated operator of the system.

7. The system according to claim 1, further comprising:
a directionality sensor device operatively coupled with the supervisory control unit, the directionality sensor device generating a direction signal representative of a sensed directionality of the physical exercise of the first operation system of the plurality of operation systems of the associated implement caused by the activation of the first hydraulic circuit of the associated work vehicle,
wherein the logic is executable by the processor to compare the sensed directionality of the physical exercise of the first operation system caused by the activation of the first hydraulic circuit of the associated work vehicle with an expected directionality of the physical exercise of the first operation system caused by the activation of the first hydraulic circuit, and selectively:
  generate directionality confirmation logical data representative of the sensed directionality of the physical exercise of the first operation system matching the expected directionality of the physical exercise of the first operation system, and store the directionality confirmation logical data in the memory device for use by the system to activate the first hydraulic circuit of the associated work vehicle in a logical direction consistent with the expected directionality; or
  generate directionality correction logical data representative of the sensed directionality of the physical exercise of the first operation system mismatching the expected directionality of the physical exercise of the first operation system, and store the directionality correction logical data in the memory device for use by the system to activate the first hydraulic circuit of the associated work vehicle in an opposite logical direction relative to the expected directionality.

8. The system according to claim 1, further comprising:
automatic calibration logic stored in the memory device of the supervisory control unit further, the automatic calibration logic being executable by the processor to:
  generate first calibration energization command data comprising a first calibration energization instruction executable by an associated work vehicle control unit of the associated work vehicle to activate the first hydraulic circuit to deliver a first hydraulic pressure to the first operation system of the associated implement operatively coupled with the first hydraulic circuit; and
  generate second calibration energization command data comprising a second calibration energization instruction executable by the associated work vehicle control unit of the associated work vehicle to activate the first hydraulic circuit to deliver a second hydraulic pressure to the first operation system of the associated implement operatively coupled with the first hydraulic circuit; and a calibration sensor device operatively coupled with the supervisory control unit, the calibration sensor device generating first and second movement level signals representative of sensed first and second movement levels of the physical exercise of the first operation system caused by the activation of the first hydraulic circuit of the associated work vehicle by the delivery of the first and second hydraulic pressures to the first operation system, wherein the automatic calibration logic is executable by the processor to generate calibration function data relating the first and second hydraulic pressures delivered to the first operation system of the associated implement based on the first and second calibration energization command data with sensed first and second movement levels of the physical exercise of the first operation system caused by the activation of the first hydraulic circuit of the associated work vehicle by the delivery of the first and second hydraulic pressures to the first operation system.

9. A method for automatic configuration detection and assignment of control of a plurality of hydraulic circuits of an associated work vehicle to a plurality of operation systems of an associated implement operatively coupled with the associated work vehicle, the method comprising:

detecting by a supervisory control unit executing logic stored in a memory device of the supervisory control unit a physical exercise of a first operation system of the plurality of operation systems of the associated implement caused by an activation of a first hydraulic circuit of the plurality of hydraulic circuits of the associated work vehicle; and generate first pairing assignment data representative of the detected physical exercise of the first operation system caused by the activation of the first hydraulic circuit, wherein the first hydraulic circuit of the plurality of hydraulic circuits of the associated work vehicle is assigned to a first operation control application based on the first pairing assignment data for control by the first operation control application of the first operation system of the associated implement using the first hydraulic circuit of the associated work vehicle.

10. The method according to claim 9, further comprising executing the logic by the processor to:

detect a physical exercise of a second operation system of the plurality of operation systems of the associated implement caused by an activation of a second hydraulic circuit of the plurality of hydraulic circuits of the associated work vehicle; and generating second pairing assignment data representative of the detected physical exercise of the second operation system caused by the activation of the second hydraulic circuit, wherein the second hydraulic circuit of the plurality of hydraulic circuits of the associated work vehicle is assigned to a second operation control application based on the second pairing assignment data for control by the second operation control application of the second operation system of the associated implement using the second hydraulic circuit of the associated work vehicle.

11. The method according to claim 10, further comprising:

executing exercise control logic stored in the memory device by the processor to:

generate first trial energization command data comprising a first trial energization instruction executable by an associated work vehicle control unit of the associated work vehicle to activate the first hydraulic circuit to deliver a first hydraulic pressure to an $i^{th}$ operation system of the associated implement operatively coupled with the first hydraulic circuit; and generate second trial energization command data comprising a second trial energization instruction executable by the associated work vehicle control unit of the associated work vehicle to activate the second hydraulic circuit to deliver a second hydraulic pressure to a $k^{th}$ operation system of the associated implement operatively coupled with the second hydraulic circuit; and operating the supervisory control unit operates to:

communicate the first trial energization command data to the associated work vehicle control unit of the associated work vehicle via the associated implement communication network to cause the first hydraulic circuit of the plurality of hydraulic circuits of the associated work vehicle to activate to deliver the first hydraulic pressure to the $i^{th}$ operation system of the associated implement operatively coupled with the first hydraulic circuit; and communicate the second trail energization command data to the associated work vehicle control unit of the associated work vehicle via the associated implement communication network to cause the second hydraulic circuit of the plurality of hydraulic circuits of the associated work vehicle to activate to deliver the second hydraulic pressure to the $k^{th}$ operation system of the associated implement operatively coupled with the first hydraulic circuit.

12. The method according to claim 11, further comprising operating the supervisory control unit to:

receive from the $i^{th}$ operation system of the associated implement via the associated implement communication network first movement verification data representative of a physical exercise of the $i^{th}$ operation system of the associated implement responsive to the communication circuit communicating the first trial movement command data to the associated work vehicle control unit to activate the first hydraulic circuit of the plurality of hydraulic circuits of the associated work vehicle causing a first physical trial movement of the $i^{th}$ operation system of the associated implement; and receive from the $k^{th}$ operation system of the associated implement via the associated implement communication network second movement verification data representative of a physical exercise of the $k^{th}$ operation system of the associated implement responsive to the communication circuit communicating the second trial movement command data to the associated work vehicle control unit to activate the second hydraulic circuit of the plurality of hydraulic circuits of the associated work vehicle causing a second physical trial movement of the $k^{th}$ operation system of the associated implement.

13. The method according to claim 11, further comprising executing the logic by the processor to:

determine the $i^{th}$ operation system to be the first operation system of the associated implement based on receiving the first movement verification data from the $i^{th}$ operation system of the associated implement in response to communicating the first trial energization command data to the associated work vehicle control unit of the associated work vehicle;
determine the $k^{th}$ operation system to be the second operation system of the associated implement based on receiving the second movement verification data from the $k^{th}$ operation system of the associated implement in response to communicating the second trial energization command data to the associated work vehicle control unit of the associated work vehicle;
generate the first pairing assignment data representative of the association of the activation of the first hydraulic circuit of the associated work vehicle with the physical exercise of the $i^{th}$ operation system of the associated implement; and
generate the second pairing assignment data representative of the association of the activation of the second hydraulic circuit of the associated work vehicle with the physical exercise of the $k^{th}$ operation system of the associated implement;
communicate the first pairing assignment data to an $i^{th}$ operation control unit of the $i^{th}$ operation system of the associated implement via the associated implement communication network, wherein the first hydraulic circuit of the plurality of hydraulic circuits of the associated work vehicle is assigned to the $i^{th}$ operation control unit based on the first pairing assignment data for control by the $i^{th}$ operation control unit of the first operation system of the associated implement using the first hydraulic circuit of the associated work vehicle; and
communicate the second pairing assignment data to a $k^{th}$ operation control unit of the $k^{th}$ operation system of the associated implement via the associated implement communication network operatively coupling the $k^{th}$ operation control unit with the hydraulic circuit assignment control unit, wherein the second hydraulic circuit of the plurality of hydraulic circuits of the associated work vehicle is assigned to the $k^{th}$ operation control unit based on the second pairing assignment data for control by the second operation control unit of the second operation system of the associated implement using the second hydraulic circuit of the associated work vehicle.

14. The method according to claim 10, further comprising:
executing exercise interlock control logic stored in the memory device by the processor to:
selectively communicate the first and second trial energization command data to the associated work vehicle control unit of the associated work vehicle in response to the exercise interlock control logic receiving an exercise confirmation signal from an associated operator of the system.

15. The method according to claim 9, further comprising:
generating by a directionality sensor device operatively coupled with the supervisory control unit a direction signal representative of a sensed directionality of the physical exercise of the first operation system of the plurality of operation systems of the associated implement caused by the activation of the first hydraulic circuit of the associated work vehicle; and
executing the logic by the processor to compare the sensed directionality of the physical exercise of the first operation system caused by the activation of the first hydraulic circuit of the associated work vehicle with an expected directionality of the physical exercise of the first operation system caused by the activation of the first hydraulic circuit, and selectively:
generating directionality confirmation logical data representative of the sensed directionality of the physical exercise of the first operation system matching the expected directionality of the physical exercise of the first operation system, and storing the directionality confirmation logical data in the memory device for use by the system to activate the first hydraulic circuit of the associated work vehicle in a logical direction consistent with the expected directionality; or
generating directionality correction logical data representative of the sensed directionality of the physical exercise of the first operation system mismatching the expected directionality of the physical exercise of the first operation system, and storing the directionality correction logical data in the memory device for use by the system to activate the first hydraulic circuit of the associated work vehicle in an opposite logical direction relative to the expected directionality.

16. The method according to claim 9, further comprising:
executing automatic calibration logic stored in the memory device of the supervisory control unit to:
generate first calibration energization command data comprising a first calibration energization instruction executable by an associated work vehicle control unit of the associated work vehicle to activate the first hydraulic circuit to deliver a first hydraulic pressure to the first operation system of the associated implement operatively coupled with the first hydraulic circuit; and
generate second calibration energization command data comprising a second calibration energization instruction executable by the associated work vehicle control unit of the associated work vehicle to activate the first hydraulic circuit to deliver a second hydraulic pressure to the first operation system of the associated implement operatively coupled with the first hydraulic circuit;
generating by a calibration sensor device operatively coupled with the supervisory control unit first and second movement level signals representative of sensed first and second movement levels of the physical exercise of the first operation system caused by the activation of the first hydraulic circuit of the associated work vehicle by the delivery of the first and second hydraulic pressures to the first operation system; and
executing the automatic calibration logic by the processor to generate calibration function data relating the first and second hydraulic pressures delivered to the first operation system of the associated implement based on the first and second calibration energization command data with sensed first and second movement levels of the physical exercise of the first operation system caused by the activation of the first hydraulic circuit of the associated work vehicle by the delivery of the first and second hydraulic pressures to the first operation system.

17. A system for automatic directionality confirmation of a plurality of hydraulic circuits of an associated work vehicle operatively coupled with a plurality of operation systems of an associated implement operatively coupled with the associated work vehicle, the system comprising:

a supervisory control unit operatively coupled with an associated implement communication network of the associated implement, the supervisory control unit comprising:
a processor;
a memory device operatively coupled with the processor;
logic stored in the memory device; and
a directionality sensor device operatively coupled with the supervisory control unit,
wherein the logic is executable by the processor to determine a physical exercise of a first operation system of the plurality of operation systems of the associated implement caused by an activation of a first hydraulic circuit of the plurality of hydraulic circuits of the associated work vehicle,
wherein the directionality sensor device is operative to generate a direction signal representative of a sensed directionality of the physical exercise of the first operation system of the plurality of operation systems of the associated implement caused by the activation of the first hydraulic circuit of the associated work vehicle,
wherein the logic is executable by the processor to compare the sensed directionality of the physical exercise of the first operation system caused by the activation of the first hydraulic circuit of the associated work vehicle with an expected directionality of the physical exercise of the first operation system caused by the activation of the first hydraulic circuit, and selectively:
generate directionality confirmation logical data representative of the sensed directionality of the physical exercise of the first operation system matching the expected directionality of the physical exercise of the first operation system, and store the directionality confirmation logical data in the memory device for use by the system to activate the first hydraulic circuit of the associated work vehicle in a logical direction consistent with the expected directionality; or
generate directionality correction logical data representative of the sensed directionality of the physical exercise of the first operation system mismatching the expected directionality of the physical exercise of the first operation system, and store the directionality correction logical data in the memory device for use by the system to activate the first hydraulic circuit of the associated work vehicle in an opposite logical direction relative to the expected directionality.

18. A system for automatic configuration calibration of a plurality of hydraulic circuits of an associated work vehicle operatively coupled with a plurality of operation systems of an associated implement operatively coupled with the associated work vehicle, the system comprising:
a supervisory control unit operatively coupled with an associated implement communication network of the associated implement, the supervisory control unit comprising:
a processor;
a memory device operatively coupled with the processor;
calibration logic stored in the memory device; and
a calibration sensor device operatively coupled with the supervisory control unit,
wherein the calibration logic being is executable by the processor to:
generate first calibration energization command data comprising a first calibration energization instruction executable by an associated work vehicle control unit of the associated work vehicle to activate the first hydraulic circuit to deliver a first hydraulic pressure to the first operation system of the associated implement operatively coupled with the first hydraulic circuit; and
generate second calibration energization command data comprising a second calibration energization instruction executable by the associated work vehicle control unit of the associated work vehicle to activate the first hydraulic circuit to deliver a second hydraulic pressure to the first operation system of the associated implement operatively coupled with the first hydraulic circuit;
wherein the calibration sensor device operates to generate first and second movement level signals representative of sensed first and second movement levels of the physical exercise of the first operation system caused by the activation of the first hydraulic circuit of the associated work vehicle by the delivery of the first and second hydraulic pressures to the first operation system,
wherein the automatic calibration logic is executable by the processor to generate calibration function data relating the first and second hydraulic pressures delivered to the first operation system of the associated implement based on the first and second calibration energization command data with sensed first and second movement levels of the physical exercise of the first operation system caused by the activation of the first hydraulic circuit of the associated work vehicle by the delivery of the first and second hydraulic pressures to the first operation system.

* * * * *